United States Patent
Zhang et al.

(10) Patent No.: US 12,413,281 B2
(45) Date of Patent: Sep. 9, 2025

(54) COMMUNICATION METHOD AND COMMUNICATION APPARATUS

(71) Applicant: HUAWEI TECHNOLOGIES CO., LTD., Shenzhen (CN)

(72) Inventors: Di Zhang, Shenzhen (CN); Lixia Xue, Beijing (CN); Xu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 17/869,208

(22) Filed: Jul. 20, 2022

(65) Prior Publication Data

US 2022/0393737 A1 Dec. 8, 2022

Related U.S. Application Data

(63) Continuation of application No. PCT/CN2020/074038, filed on Jan. 23, 2020.

(51) Int. Cl.
*H04B 7/06* (2006.01)
*H04L 5/00* (2006.01)
*H04W 24/08* (2009.01)

(52) U.S. Cl.
CPC ......... *H04B 7/0626* (2013.01); *H04L 5/0048* (2013.01); *H04W 24/08* (2013.01)

(58) Field of Classification Search
CPC .. H04B 7/0469; H04B 7/0626; H04B 7/0691; H04B 7/0874; H04L 5/0048; H04L 5/0057; H04W 24/08; H04W 72/046; Y02D 30/70

See application file for complete search history.

(56) References Cited

U.S. PATENT DOCUMENTS

| 8,953,699 B2* | 2/2015 | Sayana | H04B 7/024 375/267 |
| 9,059,753 B2* | 6/2015 | Yang | H04B 7/0691 |
| 9,537,552 B2* | 1/2017 | Li | H04L 5/005 |
| 9,585,044 B2* | 2/2017 | Park | H04B 7/0626 |
| 10,027,395 B2* | 7/2018 | Park | H04B 7/0456 |
| 10,181,890 B2* | 1/2019 | Su | H04B 7/0658 |

(Continued)

FOREIGN PATENT DOCUMENTS

| CA | 3023971 C * | 10/2023 | ............ H04B 17/30 |
| CN | 103037397 A | 4/2013 | |

(Continued)

OTHER PUBLICATIONS

CATT, Remaining issues on aperiodic CSI-RS for FD-MIMO. TSG-RAN WG1 Meeting #86bis, Lisbon, Portugal, Oct. 10-14, 2016, R1-1608733, 3 pages.

(Continued)

*Primary Examiner* — Eric Nowlin
(74) *Attorney, Agent, or Firm* — HAUPTMAN HAM, LLP

(57) ABSTRACT

A communication method includes receiving first signaling. The first signaling indicates a first reference signal resource. The first reference signal resource corresponds to P antenna ports. The method also includes receiving first indication information. The method further includes determining, by a processor, based on the first indication information, Q antenna ports that are in the P antenna ports and that are used to determine channel state information (CSI). Both P and Q are positive integers and P>Q.

20 Claims, 9 Drawing Sheets

(56) References Cited

U.S. PATENT DOCUMENTS

| | | | | |
|---|---|---|---|---|
| 10,193,609 B2* | 1/2019 | Li | | H04L 5/0048 |
| 10,476,575 B2* | 11/2019 | Park | | H04B 7/06 |
| 10,588,099 B2* | 3/2020 | Wang | | H04L 5/0035 |
| 10,630,363 B2* | 4/2020 | Xu | | H04B 7/063 |
| 10,644,769 B2* | 5/2020 | Tomeba | | H04B 7/0404 |
| 10,686,509 B2* | 6/2020 | Rahman | | H04B 7/0473 |
| 10,727,916 B2* | 7/2020 | Liu | | H04B 7/0695 |
| 10,749,584 B2* | 8/2020 | Rahman | | H04W 72/23 |
| 10,778,294 B2* | 9/2020 | Yang | | H04B 7/0634 |
| 10,938,466 B2* | 3/2021 | Rahman | | H04B 7/0417 |
| 10,944,459 B2* | 3/2021 | Rahman | | H04B 7/0626 |
| 10,944,460 B2* | 3/2021 | Rahman | | H04B 7/0469 |
| 10,944,461 B2* | 3/2021 | Rahman | | H04B 7/0695 |
| 11,012,129 B2* | 5/2021 | Petersson | | H04B 7/0619 |
| 11,088,732 B2* | 8/2021 | Park | | H04B 7/0417 |
| 11,206,177 B2* | 12/2021 | Noh | | H04L 5/005 |
| 11,218,210 B2* | 1/2022 | Wernersson | | H04L 5/0051 |
| 11,251,854 B1* | 2/2022 | Venkatesh | | H04B 7/0478 |
| 11,283,572 B2* | 3/2022 | Werner | | H04L 25/0226 |
| 11,516,745 B2* | 11/2022 | Huang | | H04W 52/367 |
| 11,546,197 B2* | 1/2023 | Yamada | | H04L 1/1896 |
| 11,870,529 B2* | 1/2024 | Harrison | | H04B 7/0456 |
| 11,909,680 B2* | 2/2024 | Yamada | | H04B 7/022 |
| 11,968,152 B2* | 4/2024 | Li | | H04L 5/0091 |
| 12,166,541 B2* | 12/2024 | Harrison | | H04W 52/08 |
| 2013/0114656 A1* | 5/2013 | Sayana | | H04B 7/024 |
| | | | | 375/260 |
| 2014/0086285 A1* | 3/2014 | Yang | | H04B 7/0417 |
| | | | | 375/219 |
| 2016/0080052 A1* | 3/2016 | Li | | H04B 7/0632 |
| | | | | 375/267 |
| 2016/0212643 A1* | 7/2016 | Park | | H04B 7/0478 |
| 2017/0164226 A1 | 6/2017 | Wei et al. | | |
| 2017/0195100 A1 | 7/2017 | Kim et al. | | |
| 2018/0041265 A1* | 2/2018 | Su | | H04B 7/0634 |
| 2018/0183503 A1* | 6/2018 | Rahman | | H04B 7/0645 |
| 2018/0219603 A1* | 8/2018 | Park | | H04B 7/0479 |
| 2018/0278312 A1* | 9/2018 | Frenne | | H04L 5/0048 |
| 2018/0316405 A1* | 11/2018 | Li | | H04L 5/0048 |
| 2019/0037505 A1* | 1/2019 | Wang | | H04L 5/00 |
| 2019/0081670 A1* | 3/2019 | Liu | | H04B 7/043 |
| 2019/0245596 A1* | 8/2019 | Tomeba | | H04B 7/0404 |
| 2019/0349035 A1* | 11/2019 | Yang | | H04B 7/066 |
| 2019/0394733 A1* | 12/2019 | Yang | | H04B 7/0404 |
| 2020/0083943 A1* | 3/2020 | Rahman | | H04B 7/0478 |
| 2020/0091981 A1* | 3/2020 | Rahman | | H04B 7/0621 |
| 2020/0091982 A1* | 3/2020 | Rahman | | H04B 7/0639 |
| 2020/0091983 A1* | 3/2020 | Rahman | | H04B 7/0417 |
| 2020/0136702 A1* | 4/2020 | Rahman | | H04B 7/0482 |
| 2020/0343947 A1* | 10/2020 | Petersson | | H04B 7/0404 |
| 2020/0358509 A1* | 11/2020 | Wernersson | | H04L 5/0051 |
| 2021/0083816 A1* | 3/2021 | Werner | | H04L 5/0023 |
| 2021/0175937 A1* | 6/2021 | Yamada | | H04W 16/28 |
| 2021/0314128 A1* | 10/2021 | Li | | H04L 5/0096 |
| 2022/0006581 A1* | 1/2022 | Yamada | | H04B 7/088 |
| 2022/0006582 A1* | 1/2022 | Yamada | | H04W 72/1273 |
| 2022/0014252 A1* | 1/2022 | Harrison | | H04B 7/0617 |
| 2022/0015039 A1* | 1/2022 | Huang | | H04W 52/367 |
| 2022/0045893 A1* | 2/2022 | Yamada | | H04L 1/1896 |
| 2022/0286174 A1* | 9/2022 | Okamura | | H04B 7/0456 |
| 2022/0295472 A1* | 9/2022 | Matsumura | | H04L 5/0023 |
| 2022/0353039 A1* | 11/2022 | Okamura | | H04W 52/146 |
| 2022/0353827 A1* | 11/2022 | Okamura | | H04B 7/0456 |
| 2023/0008524 A1* | 1/2023 | Okamura | | H04L 5/0048 |
| 2023/0094321 A1* | 3/2023 | Okamura | | H04W 52/42 |
| | | | | 375/267 |
| 2024/0039673 A1* | 2/2024 | Hu | | H04W 72/23 |

FOREIGN PATENT DOCUMENTS

| | | | | |
|---|---|---|---|---|
| CN | 105812034 A | | 7/2016 | |
| CN | 106470096 A | | 3/2017 | |
| CN | 103916945 B | * | 2/2018 | ........ H04L 27/2601 |
| CN | 108809388 A | | 11/2018 | |
| CN | 107302421 B | * | 5/2021 | .......... H04B 7/0413 |
| CN | 117015010 A | * | 11/2023 | .......... H04L 5/0048 |
| EP | 3352381 A1 | * | 7/2018 | .......... H04B 17/309 |
| EP | 2942888 B1 | * | 8/2018 | ........... H04W 24/08 |
| EP | 3429118 A1 | * | 1/2019 | .......... H04B 7/0413 |
| EP | 3447952 A1 | * | 2/2019 | ............ H04B 17/30 |
| EP | 2901568 B1 | * | 8/2019 | .......... H04B 7/0417 |
| EP | 3267593 B1 | * | 2/2020 | .......... H04B 17/336 |
| EP | 3429118 B1 | * | 6/2021 | .......... H04B 7/0413 |
| EP | 3292638 B1 | * | 11/2021 | .......... H04B 7/0404 |
| EP | 4030635 A1 | * | 7/2022 | .......... H04B 7/0404 |
| EP | 3447952 B1 | * | 7/2023 | ............. H04B 17/30 |
| EP | 4213425 A1 | * | 7/2023 | ............ H04B 17/30 |
| EP | 4518445 A1 | * | 3/2025 | .......... H04L 5/0048 |
| KR | 20250004016 A | * | 1/2025 | |
| TW | 202344014 A | * | 11/2023 | .......... H04L 5/0048 |
| WO | WO-2012144866 A2 | * | 10/2012 | ............. H04B 7/024 |
| WO | WO-2014048813 A1 | * | 4/2014 | .......... H04B 7/0417 |
| WO | WO-2016179565 A1 | * | 11/2016 | .......... H04B 7/0404 |
| WO | 2019077749 A1 | | 4/2019 | |
| WO | 2019157761 A1 | | 8/2019 | |
| WO | WO-2023207839 A1 | * | 11/2023 | .......... H04L 5/0048 |
| WO | WO-2024207519 A1 | * | 10/2024 | |
| WO | WO-2025024986 A1 | * | 2/2025 | |

OTHER PUBLICATIONS

3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.

International Search Report issued in corresponding International Application No. PCT/CN2020/074038, dated Oct. 27, 2020, pp. 1-9.

Extended European Search Report issued in corresponding European Application No. 20915382.4, dated Dec. 14, 2022, pp. 1-11.

* cited by examiner

COMMUNICATION METHOD AND COMMUNICATION APPARATUS

CROSS-REFERENCE TO RELATED APPLICATIONS

This application is a continuation of International Application No. PCT/CN2020/074038, filed on Jan. 23, 2020, the disclosure of which is hereby incorporated by reference in its entirety.

TECHNICAL FIELD

This application relates to the communication field, and more specifically, to a communication method and a communication apparatus.

BACKGROUND

In a communication system, a network device may send a channel state information reference signal (CSI-RS) to a terminal device, and the terminal device may obtain channel state information (CSI) by measuring the CSI-RS. Then, the terminal device may feed back the channel state information (CSI) to the network device, and the network device schedules the terminal device based on the CSI.

In some scenarios, the network device may save energy by shutting down some transmit (Tx) channels (or transmit antennas). After the network device shuts down some transmit channels, a transmit antenna port of the network device may change, and consequently CSI measurement may be inaccurate.

SUMMARY

This application provides a communication method and a communication apparatus, so that a transmit end and a receive end have consistent understandings on an antenna port corresponding to a reference signal resource or on a reference signal resource, to improve CSI measurement accuracy.

According to a first aspect, a communication method is provided. The method may be performed by a terminal device or a chip disposed in the terminal device. The method includes: receiving a first signaling, where the first signaling indicates a first reference signal resource, and the first reference signal resource corresponds to P antenna ports; receiving first indication information; and determining, based on the first indication information, Q antenna ports that are in the P antenna ports and that are used to determine CSI, where both P and Q are positive integers, and P>Q.

For example, the Q antenna ports belong to transmit antenna ports currently used by a network device.

According to the communication method provided in this application, when a quantity of transmit channels changes, that is, when the transmit antenna ports used by the network device change, the network device may indicate, to the terminal device based on a currently used transmit antenna port, that Q antenna ports in antenna ports corresponding to an activated reference signal resource or a previously configured but not activated reference signal resource (that is, the first reference signal resource) may still be antenna ports that are used to determine CSI. In this way, an antenna port that is understood by the terminal device and that is used by the network device to send a reference signal is consistent with an antenna port that is actually used by the network device to send a reference signal. Therefore, the terminal device may determine more accurate CSI based on measurement of the reference signal sent by the antenna port through which the reference signal is actually sent. That is, the CSI determined by the terminal device can reflect an actual channel status, so that scheduling performed by the network device on the terminal device can be optimized.

Optionally, the first indication information indicates the Q antenna ports, or the first indication information indicates an antenna port other than the Q antenna ports in the P antenna ports.

Optionally, the first indication information indicates a first energy saving mode. The determining, based on the first indication information, Q antenna ports that are in the P antenna ports and that are used to determine CSI includes: determining, based on the first energy saving mode, the Q antenna ports associated with the first energy saving mode.

Specifically, the terminal device may determine the Q antenna ports based on a preset rule and the first energy saving mode.

In this solution, an energy saving mode can be indicated by using only low bit overheads. Therefore, signaling overheads can be reduced.

With reference to the first aspect, in some implementations of the first aspect, $P=2*P1*P2$, P1 is a quantity of first-dimension antenna ports, and P2 is a quantity of second-dimension antenna ports. $Q=2*Q1*Q2$, Q1 is a quantity of first-dimension antenna ports, and Q2 is a quantity of second-dimension antenna ports. P1, P2, Q1, and Q2 are all positive integers. $Q1=P1$, and $Q2<P2$; or $Q1<P1$, and $Q2<P2$.

A first dimension may be a horizontal dimension, and a second dimension may be a vertical dimension. However, this is not limited in this application.

With reference to the first aspect, in some implementations of the first aspect, the P antenna ports are grouped into $2*A1$ groups in ascending order of antenna port indexes, and each group includes A2 antenna ports. A1 is a positive integer, and A2 is an integer greater than or equal to 2. $Q/(2*A1)$ antenna ports in each group of A2 antenna ports belong to the Q antenna ports.

Optionally, that $Q/(2*A1)$ antenna ports in each group of A2 antenna ports belong to the Q antenna ports includes one of the following: $Q/(2*A1)$ antenna ports with larger indexes in each group of A2 antenna ports belong to the Q antenna ports; $Q/(2*A1)$ antenna ports with smaller indexes in each group of A2 antenna ports belong to the Q antenna ports; $Q/(2*A1)$ antenna ports with larger indexes in each group of A2 antenna ports in the first A1 groups of the $2*A1$ groups belong to the Q antenna ports, and $Q/(2*A1)$ antenna ports with smaller indexes in each group of A2 antenna ports in the last A1 groups of the $2*A1$ groups belong to the Q antenna ports; and $Q/(2*A1)$ antenna ports with smaller indexes in each group of A2 antenna ports in the first A1 groups of the $2*A1$ groups belong to the Q antenna ports, and $Q/(2*A1)$ antenna ports with larger indexes in each group of A2 antenna ports in the last A1 groups of the $2*A1$ groups belong to the Q antenna ports.

With reference to the first aspect, in some implementations of the first aspect, the P antenna ports are classified into a first polarization direction port group and a second polarization direction port group based on polarization directions. Q/2 antenna ports in the first polarization direction port group belong to the Q ports, and Q/2 antenna ports in the second polarization direction port group belong to the Q ports.

Optionally, Q/2 ports with larger indexes in each group of P/2 ports belong to the Q ports.

Alternatively, Q/2 ports with smaller indexes in each group of P/2 ports belong to the Q ports.

Alternatively, Q/2 ports with larger indexes in P/2 ports in the former group of the two groups belong to the Q ports, and Q/2 ports with smaller indexes in P/2 ports in the latter group of the two groups belong to the Q ports.

Alternatively, Q/2 ports with smaller indexes in P/2 ports in the former group of the two groups belong to the Q ports, and Q/2 ports with larger indexes in P/2 ports in the latter group of the two groups belong to the Q ports.

With reference to the first aspect, in some implementations of the first aspect, the method may further include: determining the CSI based on the Q antenna ports and first information.

The first information indicates that a quantity of first-dimension antenna ports is B1 and a quantity of second-dimension antenna ports is B2, and both B1 and B2 are positive integers. C1 is a quantity of first-dimension antenna ports indicated by first codebook configuration information associated with the first reference signal resource, and C2 is a quantity of second-dimension antenna ports indicated by the first codebook configuration information. $B1=C1$, and $B2<C2$; or $B1<C1$, and $B2=C2$; or $B1<C1$, and $B2<C2$.

The network device may determine B1 and B2 based on an antenna port through which a reference signal is actually sent, or the terminal device may determine, based on a preset rule, B1 and B2 that match an antenna port through which a reference signal is actually sent. Because B1 and B2 match the antenna port through which the network device actually sends the reference signal, the CSI determined by the terminal device is more accurate.

According to a second aspect, a communication method is provided. The method may be performed by a network device or a chip disposed in the network device. The method includes: sending first signaling, where the first signaling indicates a first reference signal resource, and the first reference signal resource corresponds to P antenna ports; determining Q antenna ports of the P antenna ports; and sending first indication information, where the first indication information indicates one of the following: the Q antenna ports, an antenna port other than the Q antenna ports in the P antenna ports, and a first energy saving mode. The first energy saving mode is associated with the Q antenna ports.

For example, the Q antenna ports belong to transmit antenna ports currently used by the network device.

According to the communication method provided in this application, when a quantity of transmit channels changes, that is, when the transmit antenna ports used by the network device change, the network device may indicate, to a terminal device based on a currently used transmit antenna port, that Q antenna ports in antenna ports corresponding to an activated reference signal resource or a previously configured but not activated reference signal resource (that is, the first reference signal resource) may still be antenna ports that are used to determine CSI. In this way, an antenna port that is understood by the terminal device and that is used by the network device to send a reference signal is consistent with an antenna port that is actually used by the network device to send a reference signal. Therefore, the terminal device may determine more accurate CSI based on measurement of the reference signal sent by the antenna port through which the reference signal is actually sent. That is, the CSI determined by the terminal device can reflect an actual channel status, so that scheduling performed by the network device on the terminal device can be optimized.

With reference to the second aspect, in some implementations of the second aspect, $P=2*P1*P2$, P1 is a quantity of first-dimension antenna ports, and P2 is a quantity of second-dimension antenna ports. $Q=2*Q1*Q2$, Q1 is a quantity of first-dimension antenna ports, and Q2 is a quantity of second-dimension antenna ports. P1, P2, Q1, and Q2 are all positive integers. $Q1=P1$, and $Q2<P2$; or $Q1<P1$, and $Q2<P2$.

With reference to the second aspect, in some implementations of the second aspect, the P antenna ports are grouped into 2*A1 groups in ascending order of antenna port indexes, and each group includes A2 antenna ports. A1 is a positive integer, and A2 is an integer greater than or equal to 2. $Q/(2*A1)$ antenna ports in each group of A2 antenna ports belong to the Q antenna ports.

Optionally, that $Q/(2*A1)$ antenna ports in each group of A2 antenna ports belong to the Q antenna ports includes one of the following: $Q/(2*A1)$ antenna ports with larger indexes in each group of A2 antenna ports belong to the Q antenna ports; $Q/(2*A1)$ antenna ports with smaller indexes in each group of A2 antenna ports belong to the Q antenna ports; $Q/(2*A1)$ antenna ports with larger indexes in each group of A2 antenna ports in the first A1 groups of the 2*A1 groups belong to the Q antenna ports, and $Q/(2*A1)$ antenna ports with smaller indexes in each group of A2 antenna ports in the last A1 groups of the 2*A1 groups belong to the Q antenna ports; and $Q/(2*A1)$ antenna ports with smaller indexes in each group of A2 antenna ports in the first A1 groups of the 2*A1 groups belong to the Q antenna ports, and $Q/(2*A1)$ antenna ports with larger indexes in each group of A2 antenna ports in the last A1 groups of the 2*A1 groups belong to the Q antenna ports.

With reference to the second aspect, in some implementations of the second aspect, the method may further include: sending first information. The first information indicates that a quantity of first-dimension antenna ports is B1 and a quantity of second-dimension antenna ports is B2, and both B1 and B2 are positive integers. C1 is a quantity of first-dimension antenna ports indicated by first codebook configuration information associated with the first reference signal resource, and C2 is a quantity of second-dimension antenna ports indicated by the first codebook configuration information. $B1=C1$, and $B2<C2$; or $B1<C1$, and $B2=C2$; or $B1<C1$, and $B2<C2$.

The network device may determine B1 and B2 based on an antenna port through which a reference signal is actually sent, or the terminal device may determine, based on a preset rule, B1 and B2 that match an antenna port through which a reference signal is actually sent. Because B1 and B2 match the antenna port through which the network device actually sends the reference signal, the CSI determined by the terminal device is more accurate.

According to a third aspect, a communication method is provided. The method includes: receiving second signaling, where the second signaling indicates a second reference signal resource; receiving second indication information; and determining CSI based on the second indication information.

According to a fourth aspect, a communication method is provided. The method includes: sending second signaling, where the second signaling indicates a second reference signal resource; and sending second indication information, where the second indication information is used by a terminal device to determine CSI.

In the third aspect and the fourth aspect, in a first possible manner, the second indication information is used to deactivate the second reference signal resource and activate a third reference signal resource.

The second reference signal resource may include one or more reference signal resources, or the second reference signal resource may include one or more groups of reference signal resources. Antenna ports corresponding to all the reference signal resources in the second reference signal resource may be the same, or may be different.

The third reference signal resource may include one or more reference signal resources, or the third reference signal resource may include one or more groups of reference signal resources. Antenna ports corresponding to all the reference signal resources in the third reference signal resource may be the same, or may be different.

For example, the antenna ports corresponding to all the reference signal resources in the third reference signal resource belong to transmit antenna ports currently used by a network device.

Based on this solution, the network device may reactivate a reference signal resource (that is, the third reference signal resource) for the terminal device based on the transmit antenna port currently used by the network device, and deactivate a reference signal resource (that is, the second reference signal resource) that does not match the transmit antenna port currently used by the network device. In this way, a reference signal resource based on which the terminal device determines the CSI is consistent with a reference signal resource based on which the network device actually sends a reference signal, so that the terminal device can determine more accurate CSI based on the reference signal resource based on which the network device actually sends the reference signal. That is, the CSI determined by the terminal device can reflect an actual channel status, so that scheduling performed by the network device on the terminal device can be optimized.

Optionally, the second reference signal resource is associated with the third reference signal resource, and the second indication information includes information about the second reference signal resource but does not include information about the third reference signal resource.

Optionally, the second indication information includes the information about the second reference signal resource and the information about the third reference signal resource.

With reference to the third aspect, in some implementations of the third aspect, the determining CSI based on the second indication information includes: determining the CSI based on the second indication information and first information.

With reference to the fourth aspect, in some implementations of the fourth aspect, the method may further include: sending first information.

The first information indicates that a quantity of first-dimension antenna ports is Q1 and a quantity of second-dimension antenna ports is Q2; both Q1 and Q2 are integers greater than or equal to 1; Q1=P1, and Q2<P2; or Q1<P1, and Q2=P2; or Q1<P1, and Q2<P2; P1 is a quantity of first-dimension antenna ports indicated by first codebook configuration information associated with the second reference signal resource; and P2 is a quantity of second-dimension antenna ports indicated by the first codebook configuration information. A first dimension may be a horizontal dimension, and a second dimension may be a vertical dimension. However, this is not limited in this application.

Q1 and Q2 are determined based on the antenna port through which the network device actually sends the reference signal. Therefore, the CSI determined by the terminal device is more accurate.

In the third aspect and the fourth aspect, in a second possible manner, the second indication information is used to deactivate a part of the second reference signal resource that is a periodic reference signal resource.

For example, each of non-deactivated reference signal resources belongs to the transmit antenna port currently used by the network device. An antenna port corresponding to a deactivated reference signal resource includes a transmit antenna port that is currently not used by the network device.

Based on this solution, the network device may deactivate an inappropriate reference signal resource in currently activated reference signal resources based on the currently used transmit antenna port. This helps improve accuracy of CSI measurement, so that scheduling performed by the network device on the terminal device can be optimized.

In the third aspect and the fourth aspect, in a third possible manner, the second indication information indicates that a reference signal resource with a quantity of corresponding antenna ports being greater than U in the second reference signal resource is not used to determine CSI, or the second indication information indicates that a reference signal resource with a quantity of corresponding antenna ports being less than or equal to U in the second reference signal resource is used to determine CSI, where U is a positive integer. The CSI is determined based on the second indication information.

For example, an antenna port corresponding to the reference signal resource with the quantity of corresponding antenna ports being less than or equal to U in the second reference signal resource belongs to the transmit antenna port currently used by the network device.

For example, U is less than or equal to a quantity of transmit antenna ports currently used by the network device.

Based on this solution, the network device may indicate, to the terminal device based on the currently used transmit antenna port, a reference signal resource that is in currently activated reference signal resources and that can continue to be used to determine the CSI. This helps improve accuracy of CSI measurement, so that scheduling performed by the network device on the terminal device can be optimized.

According to a fifth aspect, a communication method is provided. The method includes: receiving third indication information, where the third indication information indicates an association relationship between a plurality of energy saving modes and reference signal resources; receiving fourth indication information, where the fourth indication information indicates a first energy saving mode in the plurality of energy saving modes; and determining CSI based on a reference signal resource associated with the first energy saving mode.

According to a sixth aspect, a communication method is provided. The method includes: sending third indication information, where the third indication information indicates an association relationship between a plurality of energy saving modes and reference signal resources; and sending fourth indication information, where the fourth indication information indicates a first energy saving mode in the plurality of energy saving modes, and the fourth indication information is used by a terminal device to determine a reference signal resource associated with the first energy saving mode.

For example, antenna ports corresponding to reference signal resources corresponding to any energy saving mode may be the same.

For example, the first energy saving mode is determined by a network device based on a currently used transmit antenna port.

According to the communication method provided in this application, the network device may indicate, to the terminal device, an energy saving mode matching the currently used transmit antenna port, and the terminal device may determine, based on an association relationship that is between an energy saving mode and a reference signal resource and that is preconfigured by the network device, a reference signal resource used to determine CSI. In this way, an antenna port that is understood by the terminal device and that is used by the network device to send a reference signal is consistent with an antenna port that is actually used by the network device to send a reference signal. Therefore, the terminal device may determine more accurate CSI based on measurement of the reference signal sent by the antenna port through which the reference signal is actually sent.

Optionally, the association relationship between the plurality of energy saving modes and the reference signal resources is an association relationship between the plurality of energy saving modes and a resource configuration, or an association relationship between the plurality of energy saving modes and a reporting configuration. Both the resource configuration and the reporting configuration are associated with the reference signal resource.

Optionally, the third indication information is carried in radio resource control (RRC) signaling; and/or the fourth indication information is carried in RRC signaling, media access control control element (MAC CE) signaling, or downlink control information (DCI).

According to a seventh aspect, a communication method is provided. The method includes: receiving third signaling, where the third signaling indicates L1 resource configurations and/or L2 reporting configurations, L1 and L2 are integers greater than or equal to 1, and both the resource configuration and the reporting configuration are associated with a reference signal resource; receiving fifth indication information, where the fifth indication information is used to deactivate at least one of the L1 resource configurations and/or deactivate at least one of the L2 reporting configurations; and determining CSI based on a non-deactivated resource configuration in the L1 resource configurations, or determining CSI based on a non-deactivated reporting configuration in the L2 reporting configurations.

According to an eighth aspect, a communication method is provided. The method includes: sending third signaling, where the third signaling indicates L1 resource configurations and/or L2 reporting configurations, L1 and L2 are integers greater than or equal to 1, and both the resource configuration and the reporting configuration are associated with a reference signal resource; and sending fifth indication information, where the fifth indication information is used to deactivate at least one of the L1 resource configurations and/or deactivate at least one of the L2 reporting configurations.

For example, reference signal resources associated with one resource configuration or reporting configuration correspond to a same antenna port.

For example, an antenna port corresponding to a reference signal resource associated with the non-deactivated resource configuration or reporting configuration belongs to transmit antenna ports currently used by a network device.

Optionally, the fifth indication information includes an index of the at least one resource configuration and/or an index of the at least one reporting configuration.

According to the method provided in this application, the network device may deactivate some inappropriate resource configurations or reporting configurations based on the currently used transmit antenna port, so that a terminal device may determine CSI based on a resource configuration or a reporting configuration associated with a reference signal resource whose corresponding antenna port belongs to the transmit antenna port used by the network device. This helps improve accuracy of CSI measurement, so that scheduling performed by the network device on the terminal device can be optimized.

Optionally, that the fifth indication information is used to deactivate at least one of the L1 resource configurations includes: The fifth indication information is used to deactivate all reference signal resources associated with the at least one resource configuration.

Optionally, that the fifth indication information is used to deactivate at least one of the L2 reporting configurations includes: The fifth indication information is used to deactivate all reference signal resources associated with a resource configuration associated with the at least one reporting configuration, and/or the fifth indication information is used to deactivate an uplink resource associated with the at least one reporting configuration.

Optionally, the reporting configuration is a periodic reporting configuration.

According to a ninth aspect, a communication apparatus is provided. The apparatus includes modules or units configured to perform the method in any one of the foregoing aspects or the possible implementations of the foregoing aspects.

According to a tenth aspect, a communication apparatus is provided. The apparatus includes a processor. The processor is coupled to a memory, and may be configured to execute instructions in the memory, to enable the apparatus to perform the method in any one of the foregoing aspects or the possible implementations of the foregoing aspects. Optionally, the apparatus further includes the memory. Optionally, the apparatus further includes an interface circuit, and the processor is coupled to the interface circuit.

According to an eleventh aspect, a processor is provided. The processor includes an input circuit, an output circuit, and a processing circuit. The processing circuit is configured to: receive a signal through the input circuit, and transmit a signal through the output circuit, to enable the processor to perform the method in any one of the foregoing aspects or the possible implementations of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a twelfth aspect, a communication apparatus is provided. The apparatus includes a processor and a memory. The processor is configured to: read instructions stored in the memory, receive a signal by using the receiver, and transmit a signal by using the transmitter, to perform the method in any one of the foregoing aspects or the possible implementations of the foregoing aspects.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment of this application.

The processing apparatus according to the twelfth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated in the processor, or may exist independently outside the processor.

According to a thirteenth aspect, a computer program product is provided. The computer program product includes a computer program (which may also be referred to as code or instructions). When the computer program is run, a computer is enabled to perform the method in any one of the foregoing aspects or the possible implementations of the foregoing aspects.

According to a fourteenth aspect, a computer-readable medium is provided. The computer-readable medium stores a computer program (which may also be referred to as code or instructions). When the computer program runs on a computer, the computer is enabled to perform the method in any one of the foregoing aspects or the possible implementations of the foregoing aspects.

DESCRIPTION OF EMBODIMENTS

The following describes technical solutions in this application with reference to the accompanying drawings.

The technical solutions in embodiments of this application may be applied to various communication systems, for example, a long term evolution (LTE) system, a 5th generation (5G) system, a new radio (NR) system, or another communication system that may appear in the future.

Figure 1:
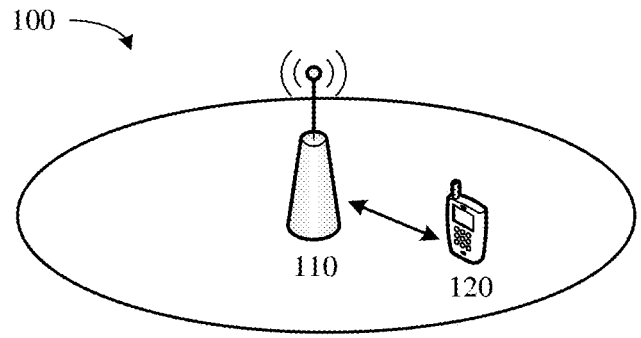
FIG. 1 is a schematic diagram of a communication system applicable to this application.

FIG. 1 is a schematic diagram of a communication system applicable to this application. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may send a reference signal to the terminal device 120 based on a reference signal resource, and the terminal device 120 may obtain CSI by measuring the reference signal. Then, the terminal device 120 may report the CSI to the network device 110, and the network device 110 may perform scheduling processing based on the CSI, for example, select an appropriate modulation and coding scheme (MCS) for downlink data transmission.

A terminal device in embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

A network device in embodiments of this application may be a device configured to communicate with a terminal device. For example, the network device may be a base station, an evolved NodeB (eNodeB), a transmission reception point (TRP), a next generation NodeB (gNB) in a 5G mobile communication system, a base station in a future mobile communication system, or an access node in a Wi-Fi system. For another example, the network device may alternatively be a module or a unit that completes some functions of the base station. For example, the network device may be a central unit (CU) or a distributed unit (DU). For still another example, the network device may alternatively be a radio controller, a relay station, an access point, a vehicle-mounted device, a wearable device, or an access network device in another future evolved communication system in a cloud radio access network (CRAN) scenario. A specific technology and a specific device form that are used by the network device are not limited in this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in embodiments of this application is not specifically limited in embodiments of this application provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk drive, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

Before the method in this application is described, several descriptions are first provided.

1. In this application, the reference signal may be used for channel measurement, interference measurement, and the like, for example, measuring parameters such as a reference signal received quality (RSRQ), a signal-noise ratio (SNR), a signal to interference plus noise ratio (SINR), a channel quality indicator (CQI), and a precoding matrix indicator (PMI).

The reference signal resource may be used to configure transmission attributes of the reference signal, for example, a time-frequency resource position, a port mapping relationship, a power factor, and a scrambling code. For details, refer to a current technology. The network device may send the reference signal based on the reference signal resource, and the terminal device may receive the reference signal based on the reference signal resource.

Specifically, the reference signal in embodiments of this application may include, for example, one or more of the following reference signals: a channel state information reference signal (CSI-RS), a synchronization signal block (SSB), or a sounding reference signal (SRS). Correspondingly, the reference signal resource may include a CSI-RS resource, an SSB resource, or an SRS resource.

It should be noted that the SSB may also be referred to as a synchronization signal/physical broadcast channel (SS/PBCH) block, and the corresponding SSB resource may also be referred to as a synchronization signal/physical broadcast channel block resource that may be briefly referred to as the SSB resource. In some cases, the SSB may also refer to the SSB resource.

2. Antenna port: The antenna port is referred to as a port for short. The antenna port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

Scenario 1: To save energy, the network device dynamically shuts down some transmit channels.

Scenario 2: To save energy, the network device uses different sending policies for a local terminal device and a remote terminal device. For example, 16Tx is used for the local terminal device, and 32Tx is used for the remote terminal device. In this case, as the terminal device moves, the network device may shut down some transmit channels.

In the foregoing scenarios, a transmit antenna port used by the network device changes. In other words, an antenna port used by the network device to send a reference signal is inconsistent with an antenna port corresponding to a previously configured reference signal resource. If the terminal device still receives the reference signal based on the antenna port corresponding to the previously configured reference signal resource, the terminal device may mistake an interference signal for the reference signal. Consequently, CSI determined by the terminal device is inaccurate, that is, the CSI determined by the terminal device cannot accurately reflect an actual channel status.

Therefore, this application provides a plurality of methods to resolve this problem. In some methods, a network device notifies a terminal device of an antenna port through which a reference signal is actually sent, so that the terminal device can obtain more accurate CSI by measuring the reference signal sent by the antenna port through which the reference signal is actually sent. In some methods, the network device may directly or indirectly activate a reference signal resource that matches an antenna port currently used by the network device, or the network device may directly or indirectly indicate, to the terminal device, a reference signal resource that matches an antenna port currently used by the network device and that is in a currently activated reference signal resource or a previously configured reference signal resource, so that the terminal device can obtain, based on an indication of the network device, the more accurate CSI by measuring the reference signal sent by the antenna port through which the reference signal is actually sent.

The following describes the methods provided in this application. It should be understood that in the following described method embodiments, only an example in which execution bodies are a network device and a terminal device is used. The network device may alternatively be replaced with a chip disposed in the network device, and the terminal device may alternatively be replaced with a chip disposed in the terminal device.

Figure 2:
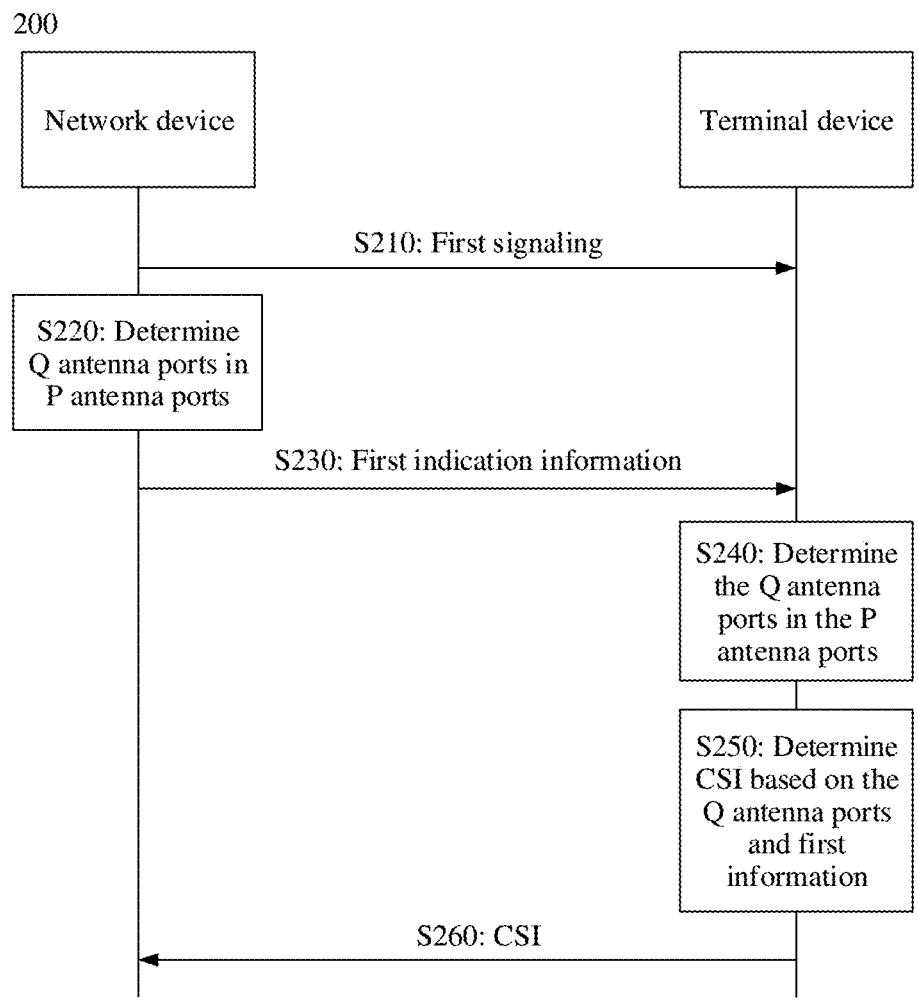
FIG. 2 is a schematic diagram of a communication method according to this application.

FIG. 2 is a schematic flowchart of a communication method according to this application. The following describes steps shown in FIG. 2.

S210: A network device sends first signaling to a terminal device. Correspondingly, the terminal device receives the first signaling.

The first signaling indicates a first reference signal resource. The first reference signal resource corresponds to P antenna ports. In other words, the first reference signal resource includes P antenna ports, where P is a positive integer.

For example, the first reference signal resource may be a currently activated reference signal resource. For example, the first signaling is RRC signaling, and the first reference signal resource is a periodic reference signal resource. For another example, the first signaling is a MAC CE, and the first reference signal resource is a semi-persistent reference signal resource.

For example, the first reference signal resource may alternatively be a configured but not activated (or not triggered) reference signal resource. For example, the first reference signal resource is an aperiodic reference signal resource, and the first signaling is RRC signaling or a MAC CE.

S220: The network device determines Q antenna ports in the P antenna ports.

For example, the network device may determine the Q antenna ports based on currently used transmit antenna ports. The Q antenna ports belong to the transmit antenna ports currently used by the network device.

S230: The network device sends first indication information to the terminal device. Correspondingly, the terminal device receives the first indication information.

For example, the first indication information may be sent simultaneously with the first signaling, or the first signaling may be sent before the first indication information.

S240: The terminal device determines, based on the first indication information, the Q antenna ports that are in the P antenna ports and that are used to determine CSI. Q is a positive integer, and P>Q.

In an example, the network device may independently determine the Q antenna ports, and then indicate the Q antenna ports to the terminal device by using the first indication information. After receiving the first indication information, the terminal device may determine the Q antenna ports. Alternatively, the network device may indicate an antenna port other than the Q antenna ports in the P antenna ports to the terminal device by using the first indication information, so that the terminal device learns of the Q antenna ports.

For example, the first indication information may be information about the Q antenna ports. For example, the first indication information may be indexes of the Q antenna ports, or may be an index of a set or a group corresponding to the Q antenna ports. The index of the set or the group corresponding to the antenna ports may be agreed on by the terminal device and the network device in advance, or may be indicated by other indication information. Alternatively, the first indication information may be information about the antenna port other than the Q antenna ports in the P antenna ports.

In another example, the network device may determine that the network device needs to enter a first energy saving mode. The first energy saving mode is associated with the Q antenna ports. That the network device determines the first energy saving mode is equivalent to describing that the network device determines the Q antenna ports. In addition, the network device may indicate the first energy saving mode to the terminal device by using the first indication information, and the terminal device may determine, based on a preset rule, the Q antenna ports associated with the first energy saving mode.

It should be understood that the preset rule is a preset rule followed by both the network device and the terminal device. The preset rule may be preconfigured by the network device, for example, configured by using RRC signaling or indicated by using MAC CE signaling, or indicated by using DCI signaling, or may be specified in a protocol.

For example, the preset rule may specify that in the first energy saving mode, an antenna port that is in antenna ports corresponding to a currently activated reference signal resource and that may be used to determine CSI, that is, an antenna port that is used by the network device to send a reference signal or an antenna port that is used by the terminal device to receive a reference signal in the antenna ports corresponding to the currently activated reference signal resource. For example, the preset rule may alternatively be one of a plurality of preset rules, and the network device may indicate the preset rule to the terminal device. For example, the network device may indicate the preset rule by using the RRC signaling, the MAC CE signaling, or the DCI signaling.

For example, the preset rule may specify that in the first energy saving mode, y(P) antenna ports with smaller indexes in the antenna ports corresponding to the currently activated reference signal resource are used to determine the CSI. y(P) is a function of P, for example, y(P)=P/2. Alternatively, y(P) may be replaced with a definite value.

The following describes a relationship between P and Q by using an example.

Relationship 1

The P antenna ports are grouped into 2*A1 groups in ascending order of antenna port indexes, and each group includes A2 antenna ports. Q/(2*A1) antenna ports in each group of A2 antenna ports belong to the Q antenna ports. A1 is a positive integer, and A2 is an integer greater than or equal to 2. Optionally, A1>2, and/or A2>2.

Example 1: Q/(2*A1) antenna ports with larger indexes in each group of A2 antenna ports belong to the Q antenna ports.

Example 2: Q/(2*A1) antenna ports with smaller indexes in each group of A2 antenna ports belong to the Q antenna ports;

Example 3: Q/(2*A1) antenna ports with larger indexes in each group of A2 antenna ports in the first A1 groups of the 2*A1 groups belong to the Q antenna ports, and Q/(2*A1) antenna ports with smaller indexes in each group of A2 antenna ports in the last A1 groups of the 2*A1 groups belong to the Q antenna ports.

Example 4: Q/(2*A1) antenna ports with smaller indexes in each group of A2 antenna ports in the first A1 groups of the 2*A1 groups belong to the Q antenna ports, and Q/(2*A1) antenna ports with larger indexes in each group of A2 antenna ports in the last A1 groups of the 2*A1 groups belong to the Q antenna ports.

Optionally, A1 may be a quantity of first-dimension antenna ports, and A2 is a quantity of second-dimension antenna ports. A first dimension may be a horizontal dimension, and a second dimension may be a vertical dimension. It should be understood that the first dimension may alternatively be a vertical dimension, and the second dimension may alternatively be a horizontal dimension.

Figure 3:
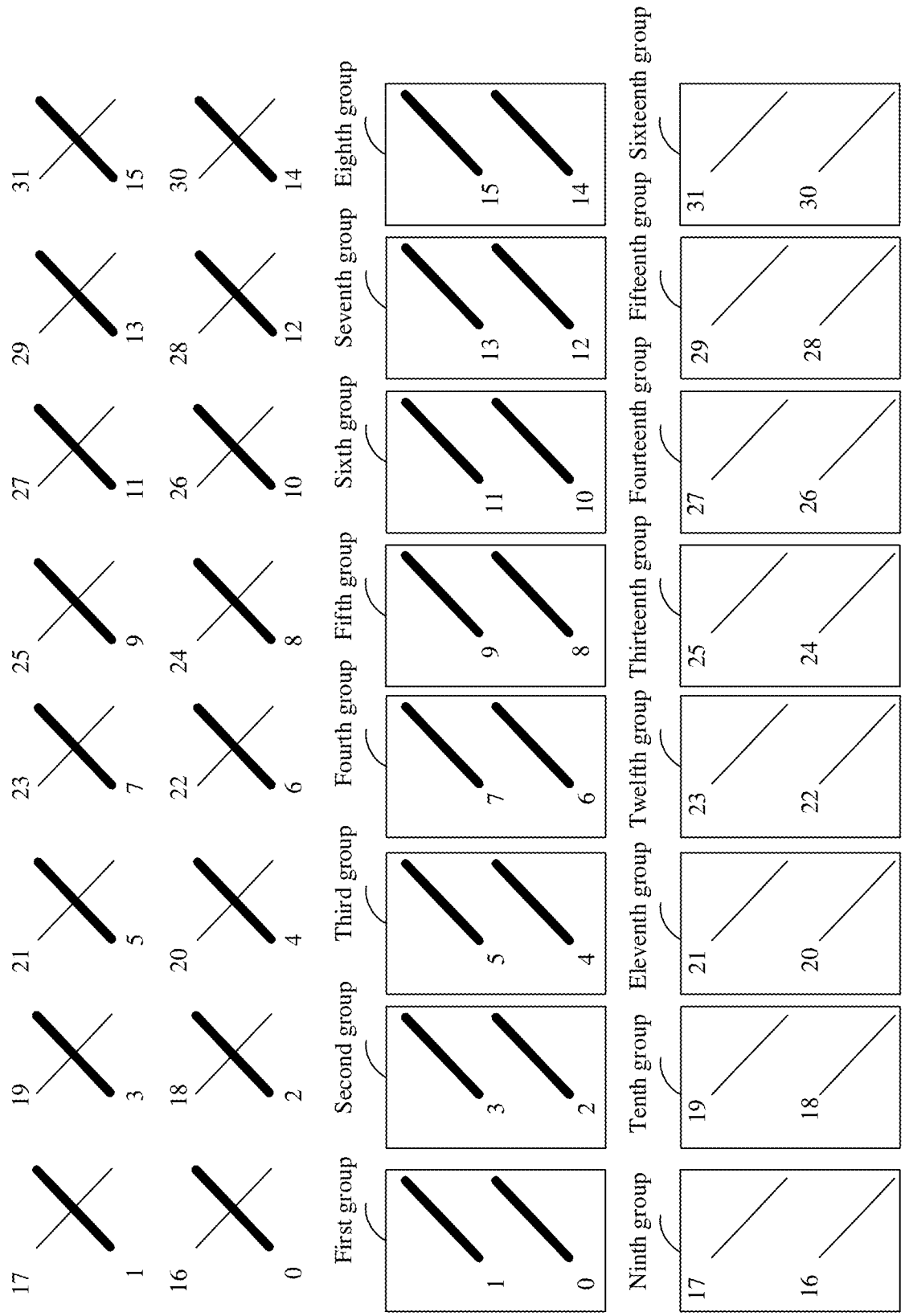
FIG. 3 is a schematic diagram of a method for selecting an antenna port.

An arrangement manner of antenna ports shown in FIG. 3 is used as an example for description. Refer to FIG. 3. P=32, A1=8, and Q=16. The 32 antenna ports may be grouped into 16 groups shown in the figure, each group has two antenna ports, and one antenna port in each group belongs to the Q (where Q=16) antenna ports.

In correspondence to Example 1, the Q antenna ports include an antenna port whose index is an odd number in the 32 antenna ports.

In correspondence to Example 2, the Q antenna ports include an antenna port whose index is an even number in the 32 antenna ports.

In correspondence to Example 3, the Q antenna ports include antenna ports whose indexes are odd numbers in the first to eighth groups, and antenna ports whose indexes are even numbers in the ninth to sixteenth groups.

In correspondence to Example 4, the Q antenna ports include antenna ports whose indexes are even numbers in the first to eighth groups, and antenna ports whose indexes are odd numbers in the ninth to sixteenth groups.

It should be understood that a relationship between P and Q specified in the preset rule may meet the relationship 1. Optionally, the preset rule may further specify values of all or some of A1, A2, and Q/(2*A1). Alternatively, the network device may independently determine that a relationship between P and Q may meet the relationship 1.

Optionally, A1 may be equal to P1, and A2 may be equal to P2. In other words, A1 may be the quantity of first-dimension antenna ports, and A2 may be the quantity of second-dimension antenna ports. In other words, A1 may be a quantity of horizontal antenna ports, and A2 may be a quantity of vertical antenna ports.

Relationship 2

The P antenna ports are classified into a first polarization direction port group and a second polarization direction port group based on polarization directions. Q/2 antenna ports in the first polarization direction port group belong to the Q ports, and Q/2 antenna ports in the second polarization direction port group belong to the Q ports.

Optionally, Q/2 ports with larger indexes in each group of P/2 ports belong to the Q ports.

Alternatively, Q/2 ports with smaller indexes in each group of P/2 ports belong to the Q ports.

Alternatively, Q/2 ports with larger indexes in P/2 ports in the former group of the two groups belong to the Q ports, and Q/2 ports with smaller indexes in P/2 ports in the latter group of the two groups belong to the Q ports.

Alternatively, Q/2 ports with smaller indexes in P/2 ports in the former group of the two groups belong to the Q ports, and Q/2 ports with larger indexes in P/2 ports in the latter group of the two groups belong to the Q ports.

Figure 4:
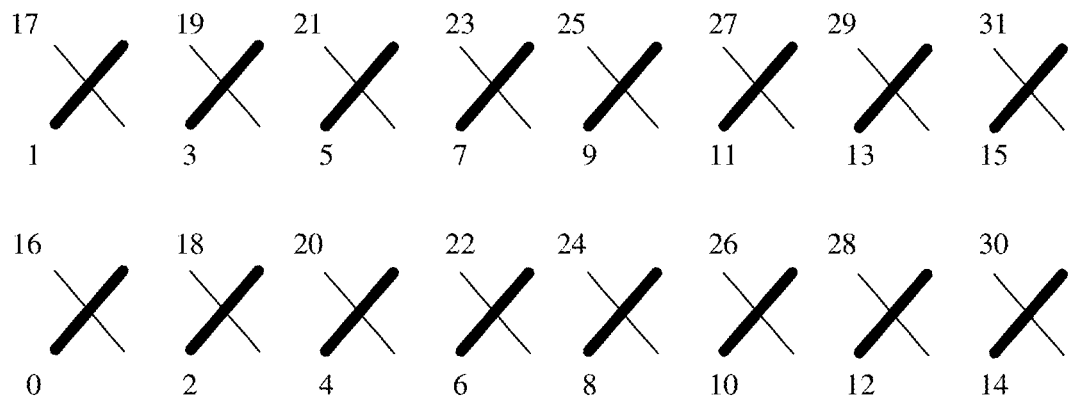
FIG. 4 is a schematic diagram of an arrangement manner of antenna ports.

An example in which P=32 and Q/2=8 is used for description. Refer to FIG. 4. The first polarization direction port group includes antenna ports whose indexes are 0 to 15, and the second polarization direction port group includes antenna ports whose indexes are 16 to 31. That is, the first polarization direction port group includes antenna ports shown by thick solid lines in the figure, and the second polarization direction port group includes antenna ports shown by thin solid lines in the figure. The Q antenna ports include eight antenna ports in the antenna ports whose indexes are 0 to 15 and eight antenna ports in the antenna ports whose indexes are 16 to 31. For example, the Q antenna ports may include the antenna ports whose indexes are 8 to 15 and 16 to 23. Alternatively, the Q antenna ports may include the antenna ports whose indexes are 0 to 7 and 16 to 23. Alternatively, the Q antenna ports may include the antenna ports whose indexes are 8 to 15 and 24 to 31. Alternatively, the Q antenna ports may include the antenna ports whose indexes are 0 to 7 and 24 to 31.

It should be understood that a relationship between P and Q specified in the preset rule may meet the relationship 2. Optionally, the preset rule may further specify a value of Q/2. Alternatively, the network device may independently determine that a relationship between P and Q may meet the relationship 2.

Relationship 3

In this relationship, the network device and the terminal device comply with the following definitions:

P=2*P1*P2, P1 is a quantity of first-dimension antenna ports, and P2 is a quantity of second-dimension antenna ports. Q=2*Q1*Q2, Q1 is a quantity of first-dimension antenna ports, and Q2 is a quantity of second-dimension antenna ports. P1, P2, Q1, and Q2 are all positive integers. P1, P2, Q1, and Q2 may meet: Q1=P1, and Q2<P2. Alternatively, Q1<P1, and Q2<P2.

A first dimension may be a horizontal dimension, and a second dimension may be a vertical dimension. However, this is not limited in this application.

Optionally, the preset rule may specify or the network device may indicate an offset value between Q1 and P1 and/or an offset value between Q2 and P2, so that the terminal device may determine values of Q1 and Q2 based on the offset values.

For example, if the offset value between Q1 and P1 is not specified, the offset value between Q1 and P1 is 0. In addition, it is also specified that the offset value between Q2 and P2 is 4. In this case, Q1=P1, and Q2=P1-4. Alternatively, the offset values (0, 4) may be specified. In this case, Q1=P1, and Q2=P1-4.

Further, a more specific specification may be further provided in the preset rule, so that the Q antenna ports may be determined. For example, it may be specified that the Q1 first-dimension antenna ports are Q1 antenna ports with smaller indexes in the first dimension, and the Q2 second-dimension antenna ports are Q2 antenna ports with smaller indexes in the second dimension.

Alternatively, the network device may indicate the value of Q1 and/or the value of Q2.

Figure 5:
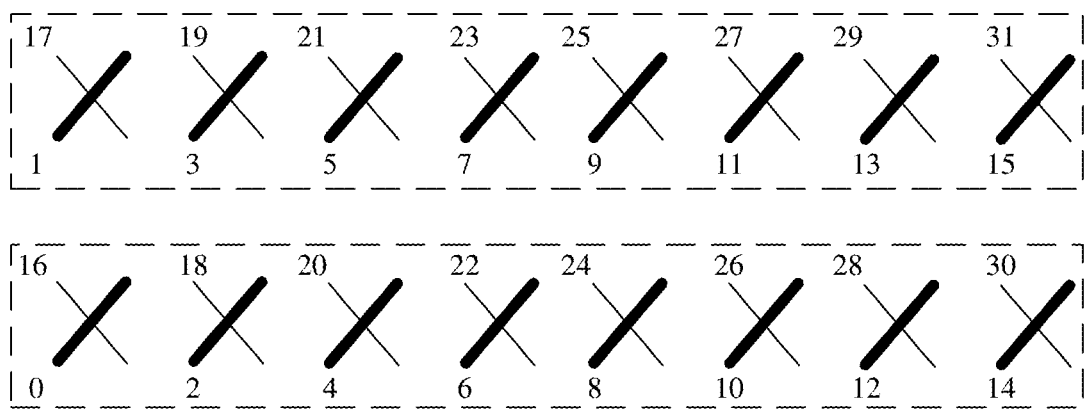
FIG. 5 is a schematic diagram of a method for selecting an antenna port.
Figure 6:
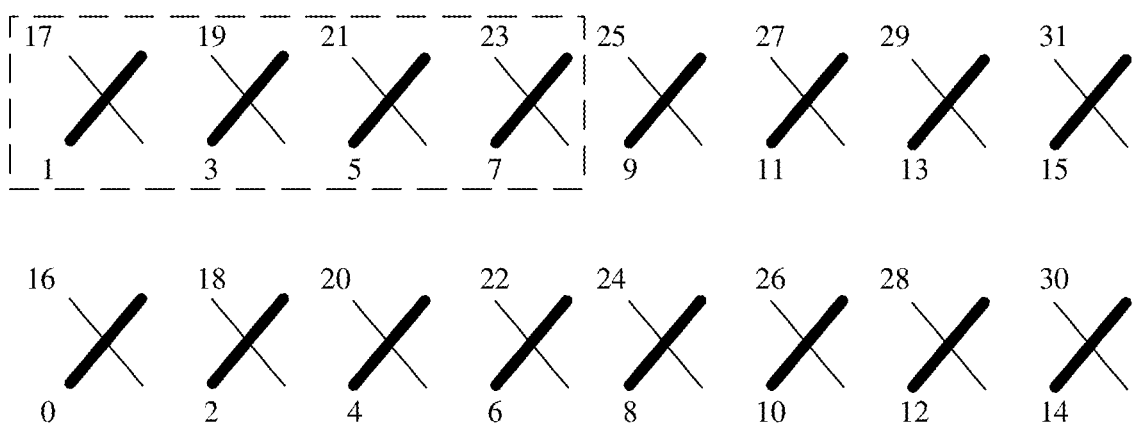
FIG. 6 is a schematic diagram of a method for selecting an antenna port.

An example is used for description with reference to FIG. 5 and FIG. 6. In antenna ports shown in FIG. 5 and FIGS. 6, P=32, P1=8, and P2=2. In an example shown in FIG. 5, Q1=P1=8, and Q2=1. In an example shown in FIGS. 6, Q1=4, and Q2=1.

As shown in FIG. 5, if the Q1 first-dimension antenna ports are Q1 antenna ports with smaller indexes in the first dimension, 16 antenna ports in the first row are the Q ports. If the Q1 first-dimension antenna ports are Q1 antenna ports with larger indexes in the first dimension, 16 antenna ports in the second row may be the Q antenna ports.

As shown in FIG. 6, if the Q1 first-dimension antenna ports are Q1 antenna ports with smaller indexes in the first dimension, and the Q2 second-dimension antenna ports are Q2 antenna ports with smaller indexes in the second dimension, eight antenna ports in a dashed-line box may be the Q antenna ports.

It should be understood that the relationship between P and Q described above is merely an example, and it is not limited in this application that Q and P definitely comply with the foregoing relationship. In addition, the relationship between P and Q described above may also be used in combination. This is not limited in this application.

It should be further understood that, in embodiments of this application, grouping is merely intended to better describe a port selection method, and the network device/terminal device may perform the action or may not perform the action. This is not limited in this application.

Optionally, assuming that an identifier or an index of the first reference signal resource is 1, the network device may configure the terminal device to use a reference signal resource whose identifier or index is 1 on a plurality of carriers or a plurality of bandwidth parts (bandwidth parts, BWPs). In this case, the first indication information may indicate that Q antenna ports in P antenna ports corresponding to the reference signal resource whose index is 1 on a specific carrier or BWP are used to determine CSI.

Optionally, the first indication information may further indicate target transmit power, the target transmit power is transmit power of the network device, and the target transmit power is determined based on the Q antenna ports. The terminal device may perform channel estimation based on the target transmit power, to determine the CSI.

For example, the first indication information may indicate the target transmit power by indicating a deviation between the target transmit power and first transmit power. The first transmit power is transmit power that is determined by the network device based on the P antenna ports and that is indicated to the terminal device.

Optionally, the network device may further determine the target transmit power based on the Q antenna ports and the first transmit power.

For example, an association relationship between an antenna ports quantity change amount and a transmit power adjustment amount may be preconfigured or predefined. In this way, the terminal device may determine a corresponding transmit power adjustment amount based on a difference obtained by subtracting Q from P. For example, a sum (the transmit power adjustment amount is a negative value) or a difference (the transmit power adjustment amount is a positive value) between the first transmit power and the transmit power adjustment amount is the target transmit power.

In conclusion, according to the communication method provided in this application, when a quantity of transmit channels changes, that is, when the transmit antenna ports used by the network device change, the network device may indicate, to the terminal device based on a currently used transmit antenna port, that Q antenna ports in antenna ports corresponding to an activated reference signal resource or a previously configured but not activated reference signal resource (that is, the first reference signal resource) may still be antenna ports that are used to determine CSI. In this way, an antenna port that is understood by the terminal device and that is used by the network device to send a reference signal is consistent with an antenna port that is actually used by the network device to send a reference signal. Therefore, the terminal device may determine more accurate CSI based on measurement of the reference signal sent by the antenna port through which the reference signal is actually sent. That is, the CSI determined by the terminal device can reflect an actual channel status, so that scheduling performed by the network device on the terminal device can be optimized.

Optionally, the method may further include the following steps:

S250: The terminal device determines the CSI based on the Q antenna ports and first information.

S260: The terminal device sends the CSI to the network device. Correspondingly, the network device receives the CSI.

The first information indicates that a quantity of first-dimension antenna ports is B1 and a quantity of second-dimension antenna ports is B2, and both B1 and B2 are positive integers. B1=C1, and B2<C2; or B1<C1, and B2=C2; or B1<C1, and B2<C2.

C1 is a quantity of first-dimension antenna ports indicated by first codebook configuration information associated with the first reference signal resource, and C2 is a quantity of second-dimension antenna ports indicated by the first codebook configuration information.

The first dimension may be a horizontal dimension, and the second dimension may be a vertical dimension. However, this is not limited in this application.

It may be understood that the first codebook configuration information is codebook configuration information associated when a quantity of ports corresponding to the first reference signal resource does not change, that is, the first codebook configuration information is configured based on the P antenna ports. C1 and C2 are respectively a quantity of first-dimension antenna ports and a quantity of second-dimension antenna ports that need to be used for determining the CSI when the P antenna ports are used for channel measurement. When a quantity of antenna ports used for channel measurement changes to Q, a quantity of first-dimension antenna ports and/or a quantity of second-dimension antenna ports that need/needs to be used for determining the CSI also correspondingly change/changes.

Optionally, B1=Q1, and B2=Q2. C1=P1, and C2=P2.
Alternatively, 2*C1*C2=P, and 2*B1*B2=Q.
Alternatively, C1<P1, and C2<P2.
Alternatively, 2*C1*C2<P, and 2*B1*B2<Q.
Alternatively, 2*C1*C2<P.

For meanings or relationships of Q1, Q2, and Q, refer to the foregoing descriptions.

Figure 7:
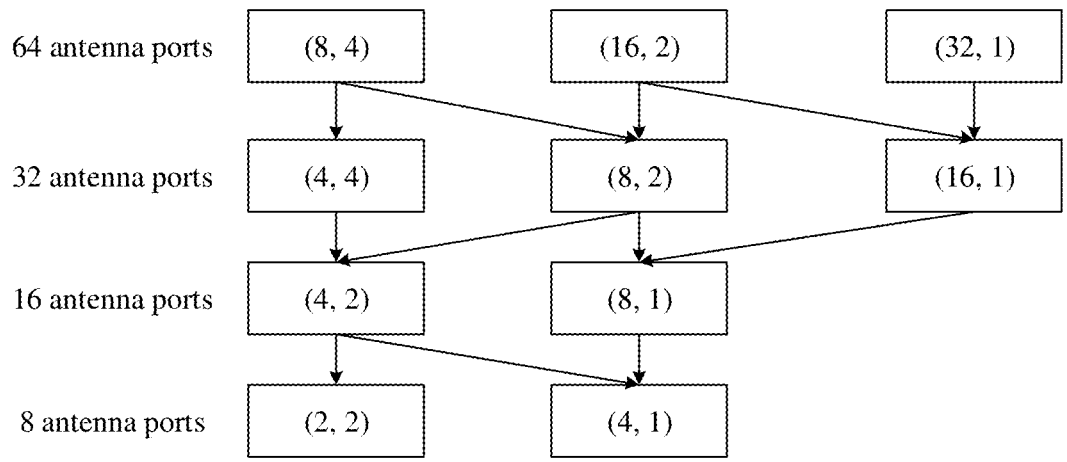
FIG. 7 is a schematic diagram of a method for determining a quantity of first-dimension antenna ports and a quantity of second-dimension antenna ports.
Figure 8:
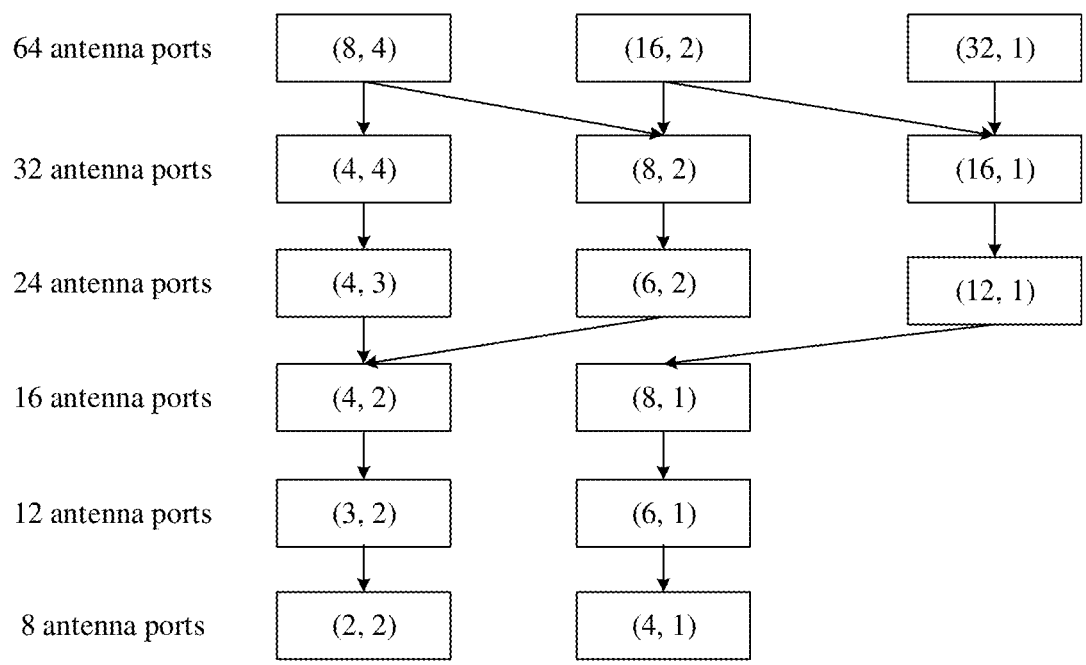
FIG. 8 is a schematic diagram of another method for determining a quantity of first-dimension antenna ports and a quantity of second-dimension antenna ports.

The following describes possible values of C1, C2, B1, and B2 by using examples with reference to FIG. 7 and FIG. 8. In FIG. 7 and FIG. 8, (B1, B2) may be determined based on a connection line from (C1, C2) to (B1, B2). There may be one or more connection lines from (C1, C2) to (B1, B2).

For example, in FIG. 7, if P=64, and (C1, C2)=(8, 4), when Q=32, (B1, B2) may be (8, 2) or (4, 4). If P=64, and (C1, C2)=(16, 2), when Q=16, (B1, B2) may be (4, 2) or (8, 1).

For example, in FIG. 8, if P=64, and (C1, C2)=(8, 4), when Q=32, (B1, B2) may be (8, 2) or (4, 4). If P=24 and (C1, C2)=(4, 3), when Q=16, (B1, B2) may be (4, 2).

Optionally, a correspondence between {P, (C1, C2)} and {Q, (B1, B2)} is predefined. Therefore, the values of B1 and B2 may be determined based on the predefined correspondence, provided that values of P, C1, C2, and Q are determined.

Optionally, the first information may alternatively be sent by the network device. For example, the network device may include the first information in RRC signaling, a MAC CE, or DCI.

For example, the first information may indicate the values of B1 and B2, or may indicate an offset value between B1 and C1 and/or an offset value between B2 and C2. For example, if the first information is information indicating (0, 4), it may be determined that B1=C1 and B2=C2-4.

For another example, there is a preset relationship between B1 and B2, and the first information may indicate the values of B1 and B2 by indicating the value of B1 or B2. For example, the first information may be one-bit information. For example, when the first information is 0, it indicates that B1=C1 and B2=C2-1.

Alternatively, there is a preset relationship between the offset value between B1 and C1 and the offset value between B2 and C2. The first information may indicate the offset value between B1 and C1 and the offset value between B2 and C2 by indicating the offset value between B1 and C1 or the offset value between B2 and C2.

The first information and the first indication information may be carried in a same piece of signaling, or may be carried in different pieces of signaling. This is not limited in this application.

It may be understood that, because the quantity of first-dimension antenna ports and the quantity of second-dimension antenna ports that are used when the terminal device needs to determine the CSI are determined based on an antenna port through which the network device actually sends a reference signal, the CSI determined by the terminal device is more accurate.

It should be understood that in embodiments of this application, the terminal device needs to determine a PMI based on the quantity of first-dimension antenna ports B1 and the quantity of second-dimension antenna ports B2. For example, the terminal device selects, based on current CSI measurement, a DFT vector that approximates a current channel eigenvector. The DFT vector is a Kronecker product of a first DFT vector and a second DFT vector. A dimension of the first DFT vector is the quantity B1 of first-dimension antenna ports, and a dimension of the second DFT vector is the quantity B2 of second-dimension antenna ports.

An example is as follows:

$$u_l = \begin{cases} \left[ 1 \ e^{j\frac{2l\pi}{O_1 B1}} \ \ldots \ e^{j\frac{2\pi l(B1-1)}{O_1 B1}} \right], & B1 > 1 \\ 1, & B1 = 1 \end{cases}$$

$$u_m = \begin{cases} \left[ 1 \ e^{j\frac{2\pi m}{O_2 B2}} \ \ldots \ e^{j\frac{2\pi m(B2-1)}{O_2 B2}} \right], & B2 > 1 \\ 1, & B2 = 1 \end{cases}$$

$$v_{l,m} = \left[ u_m \ e^{j\frac{2\pi l}{O_1 B1}} u_m \ \ldots \ e^{j\frac{2\pi l(B1-1)}{O_1 B1}} u_m \right]^T$$

$u_l$ is the first DFT vector, $u_m$ is the second DFT vector, and $v_{l,m}$ is the Kronecker product of the first DFT vector and the second DFT vector. $v_{l,m}$ may be referred to as a precoding matrix or a candidate precoding matrix.

Figure 9:
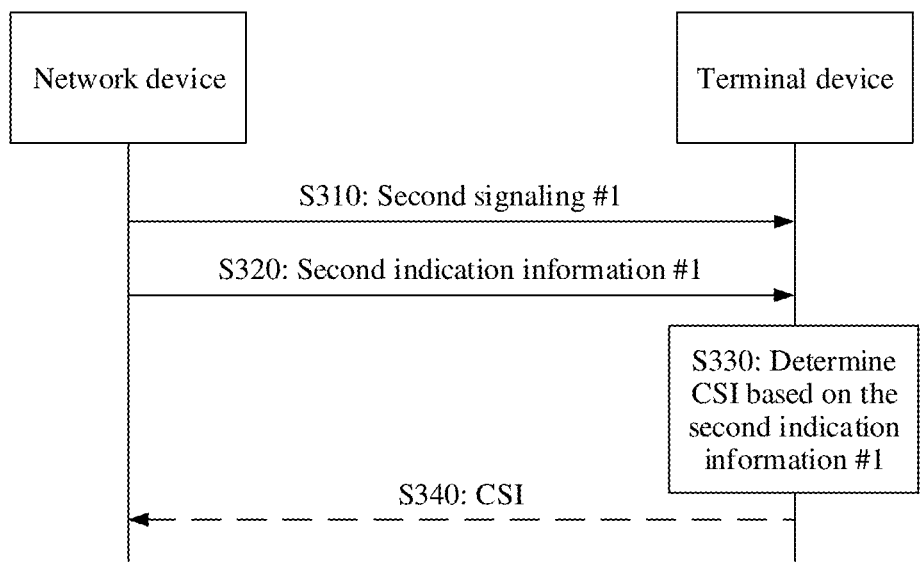
FIG. 9 to FIG. 13 each are a schematic diagram of a communication method according to this application.

In addition, it should be noted that if the first reference signal resource is already activated by using the first signaling, the terminal device may receive the reference signal based on the Q antenna ports in step S250. If the first reference signal resource is not activated by using the first signaling, the network device first needs to activate the first reference signal resource, and then receives the reference signal based on the Q antenna ports in step S250. For example, when the first reference signal resource is an aperiodic reference signal resource, and the first signaling is a MAC CE, the network device may activate the first reference signal resource by sending DCI. FIG. 9 is a schematic flowchart of a communication method according to this application. The following describes steps in the method 300 shown in FIG. 9.

S310: A network device sends second signaling #1 (that is, an example of second signaling) to a terminal device. Correspondingly, the terminal device receives the second signaling #1. The second signaling #1 indicates a second reference signal resource #1 (that is, an example of a second reference signal resource).

The second reference signal resource #1 may include one or more reference signal resources, or the second reference signal resource #1 may include one or more groups of reference signal resources.

For example, antenna ports corresponding to all the reference signal resources in the second reference signal resource #1 may be the same, or may be different.

For example, the second reference signal resource #1 may be a periodic reference signal resource. In this case, the second signaling #1 may be RRC signaling. However, this is not limited in this application. Alternatively, the second reference signal resource #1 may be a semi-persistent reference signal resource. In this case, the second signaling #1 may be a MAC CE. However, this is not limited in this application.

S320: The network device sends second indication information #1 (that is, an example of the second indication information) to the terminal device. Correspondingly, the terminal device receives the second indication information #1.

The second indication information #1 is used to deactivate the second reference signal resource #1 and activate a third reference signal resource.

The third reference signal resource may include one or more reference signal resources, or the third reference signal resource may include one or more groups of reference signal resources.

For example, antenna ports corresponding to all the reference signal resources in the third reference signal resource may be the same, or may be different.

For example, the antenna ports corresponding to all the reference signal resources in the third reference signal resource belong to transmit antenna ports currently used by the network device.

For example, the third reference signal resource may be a periodic reference signal resource, a semi-persistent reference signal resource, or an aperiodic reference signal resource.

For example, the second indication information #1 may be RRC signaling, a MAC CE, or DCI. This is not limited in this application.

Optionally, it may be preconfigured in such a manner that the second reference signal resource #1 and the third reference signal resource are associated. In this case, the second indication information #1 may implicitly indicate, by carrying information about the second reference signal resource #1, to deactivate the second reference signal resource #1 and activate the third reference signal resource.

Optionally, the second indication information #1 may explicitly indicate, by carrying both the information about the second reference signal resource #1 and information about the third reference signal resource, to deactivate the second reference signal resource #1 and activate the third reference signal resource.

For example, information about a reference signal resource may be an index of the reference signal resource. When the second reference signal resource #1 or the third reference signal resource is one or more groups of reference signal resources, information about a corresponding reference signal resource may be an index of the group or an index of each reference signal resource in the group.

It should be understood that in embodiments of this application, the one or more groups of reference signal resources may be one or more reference signal resource sets.

S330: The terminal device determines CSI based on the second indication information #1.

The network device sends a reference signal based on the third reference signal resource, the terminal device receives the reference signal based on the third reference signal resource, and the terminal device may determine the CSI by measuring the reference signal sent based on the third reference signal resource.

Optionally, that the terminal device determines CSI based on the second indication information #1 includes: The terminal device determines the CSI based on the second indication information #1 and second information.

The second information indicates that a quantity of first-dimension antenna ports is B1 and a quantity of second-dimension antenna ports is B2, and both B1 and B2 are positive integers. A first dimension may be a horizontal dimension, and a second dimension may be a vertical dimension. However, this is not limited in this application.

It should be understood that B1 and B2 are respectively the quantity of first-dimension antenna ports and the quantity of second-dimension antenna ports that are used when the terminal device determines the CSI.

In this application, B1, B2, C1, and C2 meet the following:

$$B1=C1, \text{ and } B2<C2; \text{ or } B1<C1, \text{ and } B2=C2; \text{ or } B1<C1, \text{ and } B2<C2.$$

C1 is a quantity of first-dimension antenna ports indicated by first codebook configuration information associated with the second reference signal resource #1, and C2 is a quantity of second-dimension antenna ports indicated by the first codebook configuration information.

Optionally, B1=Q1, and B2=Q2. C1=P1, and C2=P2.
Alternatively, 2*C1*C2=P, and 2*B1*B2=Q.
Alternatively, C1<P1, and C2<P2.
Alternatively, 2*C1*C2<P, and 2*B1*B2<Q.
Alternatively, 2*C1*C2<P.

P=2*P1*P2, P may be a quantity of antenna ports corresponding to a reference signal resource that corresponds to a largest quantity of antenna ports in the second reference signal resource #1, P1 is a quantity of first-dimension antenna ports, and P2 is a quantity of second-dimension antenna ports. Q=2*Q1*Q2, Q may be a quantity of antenna ports corresponding to a reference signal resource that corresponds to a largest quantity of antenna ports in the third reference signal resource, Q1 is a quantity of first-dimension antenna ports, and Q2 is a quantity of second-dimension antenna ports.

Optionally, for an example of values of P, Q, C1, C2, B1, and B2, refer to FIG. 7 or FIG. 8.

In an example, the second information is codebook configuration information in a reporting configuration associated with the third reference signal resource. The codebook configuration information may carry the values of B1 and B2.

In another example, the second information may implicitly indicate the values of B1 and B2 by carrying an offset value between B1 and C1 and/or an offset value between B1 and C2. For example, the second indication information #1 may implicitly indicate B1=C1 and B2=C2-4 by carrying offset values (0, 4).

Optionally, the second information and the second indication information #1 may be carried in a same piece of signaling, or may be carried in different pieces of signaling. This is not limited in this application.

In still another example, a correspondence between {P, (C1, C2)} and {Q, (B1, B2)} may be predefined. Therefore, the values of B1 and B2 may be determined based on the predefined correspondence, provided that the values of P, C1, C2, and Q are determined.

Optionally, the method may further include the following step:

5340: The terminal device reports the CSI to the network device. Correspondingly, the network device receives the CSI.

In conclusion, according to the communication method provided in this application, the network device may reactivate a reference signal resource (that is, the third reference signal resource) for the terminal device based on the transmit antenna port currently used by the network device, and deactivate a reference signal resource (that is, the second reference signal resource) that does not match the transmit antenna port currently used by the network device. In this way, a reference signal resource based on which the terminal device determines the CSI is consistent with a reference signal resource based on which the network device actually sends a reference signal, so that the terminal device can determine more accurate CSI based on the reference signal resource based on which the network device actually sends the reference signal. That is, the CSI determined by the terminal device can reflect an actual channel status, so that scheduling performed by the network device on the terminal device can be optimized.

Further, because the quantity of first-dimension antenna ports and the quantity of second-dimension antenna ports that are used when the terminal device determines the CSI are determined based on the antenna port through which the network device actually sends the reference signal, the CSI determined by the terminal device is more accurate.

Figure 10:
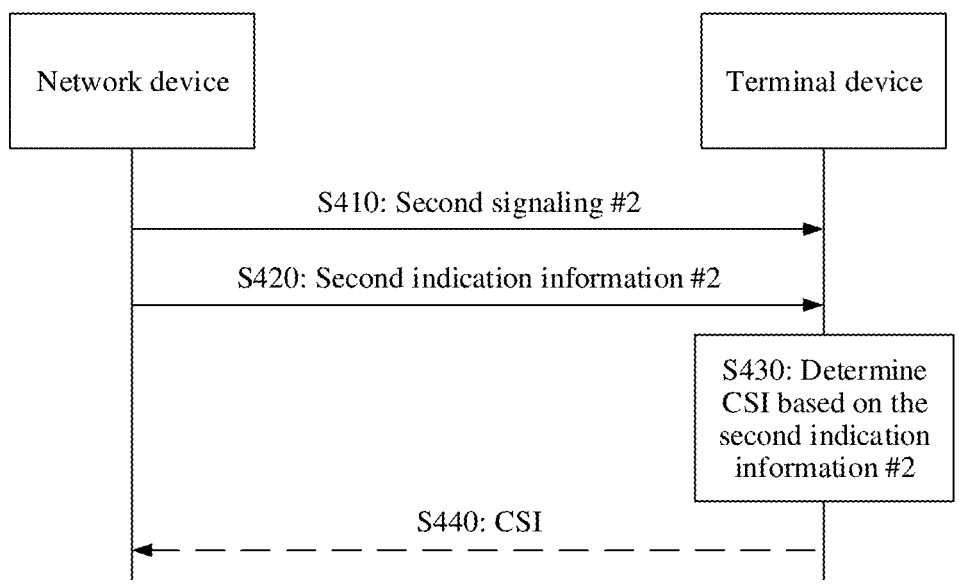

FIG. 10 is a schematic flowchart of a communication method according to this application. The following describes steps in the method 400 shown in FIG. 10.

S410: A network device sends second signaling #2 (that is, another example of second signaling) to a terminal device. Correspondingly, the terminal device receives the second signaling #2. The second signaling #2 indicates a second reference signal resource #2 (that is, another example of a second reference signal resource).

The second reference signal resource #2 may be a plurality of groups of reference signal resources, or the second reference signal resource may include a plurality of reference signal resources. In addition, the second reference signal resource #2 is a periodic reference signal resource.

For example, antenna ports corresponding to at least two reference signal resources in the second reference signal resource #2 are different. For example, when the second reference signal resource #2 is two groups of reference signal resources, all reference signal resources in each group may correspond to a same antenna port, but the two groups of reference signal resources correspond to different antenna ports. For example, one group corresponds to 12 antenna ports, and the other group corresponds to 24 antenna ports.

For example, a reporting configuration associated with the second reference signal resource #2 may be a periodic reporting configuration. For a specific form of the periodic reporting configuration, refer to a current technology.

For example, the second signaling #2 may be RRC signaling.

S420: The network device sends second indication information #2 (that is, another example of the second indication information) to the terminal device. Correspondingly, the terminal device receives the second indication information #2.

The second indication information #2 is used to deactivate a part of the second reference signal resource #2. For example, the second reference signal resource #2 is two groups of reference signal resources, and the second indication information #2 may deactivate one group of reference signal resources.

It may be understood that the second reference signal resource #2 includes two parts: a deactivated reference signal resource and a non-deactivated reference signal resource.

For example, each of non-deactivated reference signal resources belongs to a transmit antenna port currently used by the network device. An antenna port corresponding to a deactivated reference signal resource includes a transmit antenna port that is currently not used by the network device.

Optionally, the second indication information #2 may be RRC signaling, a MAC CE, or DCI.

S430: The terminal device determines CSI based on the second indication information #2.

The network device sends a reference signal based on the non-deactivated reference signal resource in the second reference signal resource #2. The terminal device receives the reference signal based on the non-deactivated reference signal resource, and may determine the CSI by measuring the reference signal sent on the non-deactivated reference signal resource.

For how the terminal device determines the CSI based on measurement of the reference signal, refer to the current technology.

Optionally, the method may further include the following step:

S440: The terminal device reports the CSI to the network device. Correspondingly, the network device receives the CSI.

In conclusion, according to the communication method provided in this application, the network device may deactivate an inappropriate reference signal resource in currently activated reference signal resources based on the currently used transmit antenna port. This helps improve accuracy of CSI measurement, so that scheduling performed by the network device on the terminal device can be optimized.

Optionally, the method may further include: The network device activates the deactivated reference signal resource.

For example, when the transmit antenna port used by the network device is the same as an antenna port corresponding to the deactivated reference signal resource, the network device may activate the deactivated reference signal resource. Therefore, the terminal device can determine accurate CSI by measuring reference signals of a plurality of antenna ports.

Figure 11:
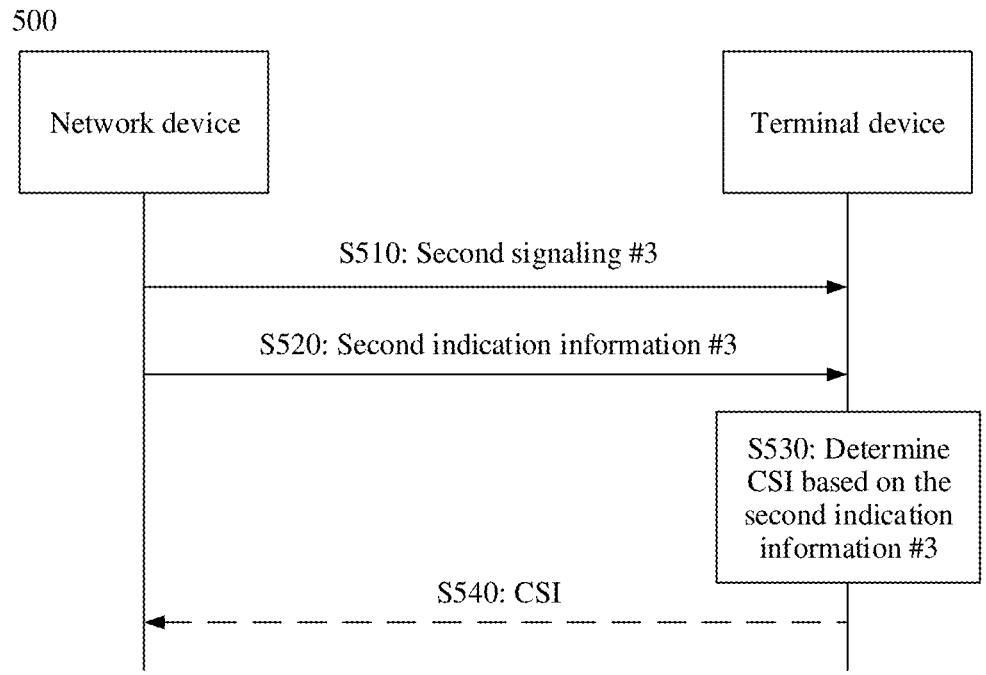

FIG. 11 is a schematic flowchart of a communication method according to this application. The following describes steps in the method 500 shown in FIG. 11.

S510: A network device sends second signaling #3 (that is, another example of second signaling) to a terminal device. Correspondingly, the terminal device receives the second signaling #3. The second signaling #3 indicates a second reference signal resource #3 (that is, another example of a second reference signal resource).

The second reference signal resource #3 may include a plurality of or a plurality of groups of reference signal resources.

For example, at least two reference signal resources or at least two groups of reference signal resources in the second reference signal resource #3 correspond to different antenna ports.

For example, the second reference signal resource #3 may be a periodic reference signal resource. In this case, the second signaling #3 may be RRC signaling. However, this is not limited in this application. Alternatively, the second reference signal resource #3 may be a semi-persistent reference signal resource. In this case, the second signaling #3 may be a MAC CE. However, this is not limited in this application.

S520: The network device sends second indication information #3 (that is, another example of second indication information) to the terminal device. Correspondingly, the terminal device receives the second indication information #3.

The second indication information #3 indicates that a reference signal resource with a quantity of corresponding antenna ports being greater than U in the second reference signal resource #3 is not used to determine CSI. Alternatively, the second indication information indicates that a reference signal resource with a quantity of corresponding antenna ports being less than or equal to U in the second reference signal resource #3 is used to determine CSI. U is a positive integer.

Alternatively, the second indication information #3 indicates that a reference signal resource that is in the second reference signal resource #3 and whose corresponding antenna ports include an antenna port not belonging to antenna ports currently used by the network device is not used to determine CSI. Alternatively, the second indication information indicates that a reference signal resource that is in the second reference signal resource #3 and whose corresponding antenna ports all belong to antenna ports currently used by the network device is used to determine CSI.

For example, the second indication information #3 may carry a value of U. Alternatively, the second indication information may occupy one bit. For example, when a value of the bit is 1, it indicates that the reference signal resource with the quantity of corresponding antenna ports being greater than U in the second reference signal resource #3 is not used to determine the CSI.

For example, U is less than or equal to a quantity of transmit antenna ports currently used by the network device.

Optionally, the second indication information #3 may be RRC signaling, a MAC CE, or DCI.

Optionally, assuming that an identifier or an index of the second reference signal resource #3 is 3, the network device may configure the terminal device to use a reference signal resource whose identifier or index is 3 on a plurality of carriers or a plurality of BWPs. In this case, the second indication information may indicate that Q antenna ports in P antenna ports corresponding to the reference signal resource whose index is 3 on a specific carrier or BWP are used to determine the CSI.

S530: The terminal device determines the CSI based on the second indication information #3.

Based on the second indication information #3, the terminal device may receive a reference signal based only on the reference signal resource used to determine the CSI, and determine the CSI by measuring the reference signal.

For how the terminal device determines the CSI based on measurement of the reference signal, refer to a current technology.

Optionally, the method may further include the following step:

S540: The terminal device reports the CSI to the network device. Correspondingly, the network device receives the CSI.

In conclusion, according to the communication method provided in this application, the network device may indicate, to the terminal device based on the currently used transmit antenna port, a reference signal resource that is in currently activated reference signal resources and that can continue to be used to determine the CSI. This helps improve accuracy of CSI measurement, so that scheduling performed by the network device on the terminal device can be optimized.

Figure 12:
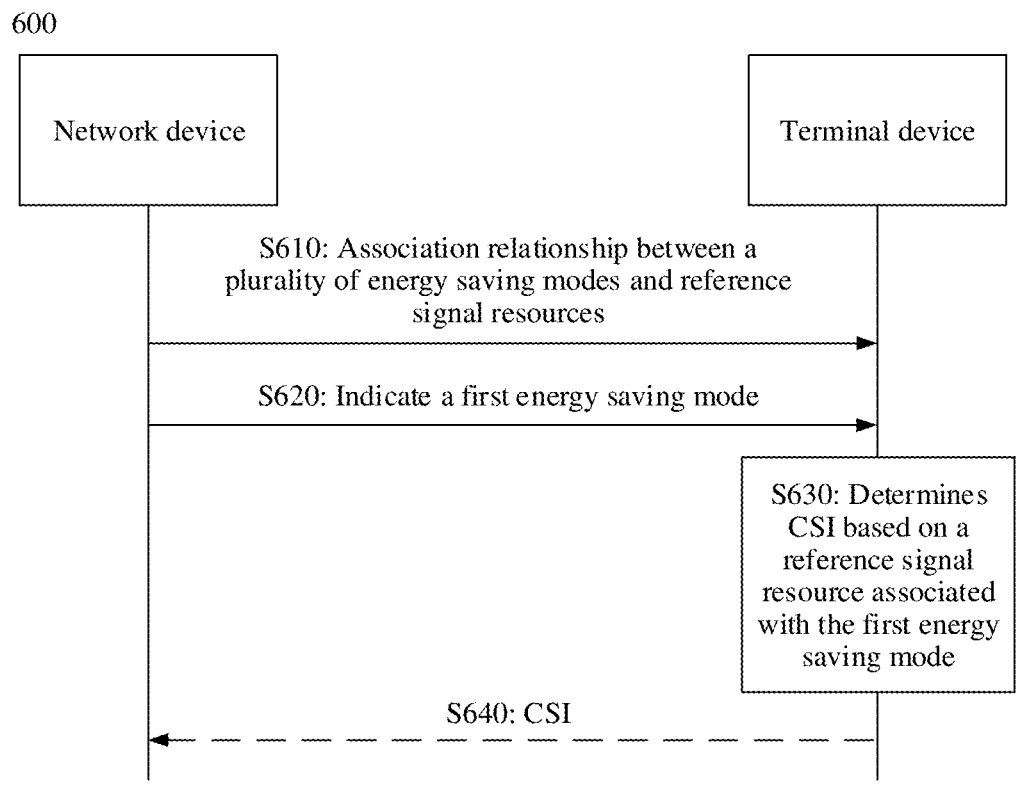

FIG. 12 is a schematic flowchart of another communication method according to this application. The following describes steps in the method 600 shown in FIG. 12.

S610: The network device sends third indication information to the terminal device. Correspondingly, the terminal device receives the third indication information.

The third indication information indicates an association relationship between a plurality of energy saving modes and reference signal resources.

For example, the association relationship between the plurality of energy saving modes and the reference signal resources may be shown in Table 1.

TABLE 1

| Energy saving mode | Reference signal resource |
|---|---|
| First energy saving mode | Reference signal resource #0 to reference signal resource #7 |
| Second energy saving mode | Reference signal resource #8 to reference signal resource #15 |
| Third energy saving mode | Reference signal resource #16 to reference signal resource #23 |
| ... | ... |

In Table 1, antenna ports corresponding to reference signal resources corresponding to any energy saving mode may be the same. However, this is not limited in this application.

It should be understood that the reference signal resource may alternatively be associated with an energy saving mode in a form of a set or a group. For example, the first energy saving mode may be associated with a reference signal group #a1 or associated with reference signal groups #a1 and #a2 in Table 1.

For example, when transmit antenna ports used by the network device are different, or transmit antenna ports used by the network device belong to different sets, corresponding energy saving modes may be different.

Optionally, the association relationship between the plurality of energy saving modes and the reference signal resources may be: an association relationship between the plurality of energy saving modes and a resource configuration (CSI-ResourceConfig), or an association relationship between the plurality of energy saving modes and a reporting configuration (CSI-ReportConfig). Both the resource configuration and the reporting configuration are associated with the reference signal resource.

In other words, the reference signal resource associated with the energy saving mode may be a reference signal resource associated with the resource configuration, or may be a reference signal resource associated with the reporting configuration.

It should be understood that the network device may send CSI-ResourceConfig to the terminal device by using an RRC message, where each CSI-ResourceConfig may include one or more reference signal resources. The reference signal resource included in CSI-ResourceConfig is a reference signal resource associated with CSI-ResourceConfig.

It should be further understood that CSI-ReportConfig may include one or more reference signal resources, that is, CSI-ReportConfig is associated with one or more reference signal resources. CSI-ReportConfig may further include some reporting parameters. The terminal device may report, based on these reporting parameters, CSI determined based on the reference signal resource associated with CSI-ReportConfig. The reporting parameter may include, for example, a reporting type (periodic, aperiodic, or semi-persistent) of the CSI.

It should be further understood that a reference signal resource associated with one reporting configuration is configured by using a resource configuration.

For example, one reporting configuration may be associated with one or more resource configurations.

Optionally, the third indication information may be carried by using RRC signaling. However, this is not limited in this application. For example, the third indication information may alternatively be carried by using a MAC CE.

S620: The network device sends fourth indication information to the terminal device. Correspondingly, the terminal device receives the fourth indication information.

The fourth indication information indicates a first energy saving mode in the plurality of energy saving modes.

For example, the network device may determine, based on a currently used transmit antenna port, that a corresponding energy saving mode is the first energy saving mode, and then indicate the first energy saving mode to the terminal device.

In this application, the fourth indication information indicates the first energy saving mode, to activate (or indicate) a reference signal resource associated with (or corresponding to) the first energy saving mode.

For example, the network device may configure, when sending the fourth indication information, a configuration of the reference signal resource associated with the first energy saving mode, or the network device may configure, before sending the fourth indication information, the reference signal resource associated with the first energy saving mode. Alternatively, the network device may configure, after sending the fourth indication information, the reference signal resource associated with the first energy saving mode.

The reference signal resource associated with the first energy saving mode may be a periodic reference signal resource. A difference from a periodic reference signal resource in a current technology lies in that, in the method, the terminal device can use the reference signal resource only after receiving indication information indicating the energy saving mode associated with the reference signal resource. Alternatively, the reference signal resource associated with the first energy saving mode may be a semi-persistent or aperiodic reference signal resource. This is not limited in this application.

Optionally, the fourth indication information may further indicate a transmit power adjustment amount corresponding to the energy saving mode. In this way, after an energy saving mode changes, the terminal device may determine, based on transmit power corresponding to an energy saving mode that is not changed and transmit power adjustment amount corresponding to a changed energy saving mode, transmit power corresponding to the changed energy saving mode.

For example, the energy saving mode changes from the first energy saving mode to the second energy saving mode, transmit power corresponding to the first energy saving mode is power 1, and transmit power adjustment amount corresponding to the second energy saving mode is a. Therefore, transmit power corresponding to the second energy saving mode power 2 is equal to power 1-a. It should be understood that, in the example, a quantity of antenna ports corresponding to the second energy saving mode is less than a quantity of antenna ports corresponding to the first energy saving mode, and a is a positive number. It should be further understood that similar variations shall also fall within the protection scope of this application.

It should be understood that the transmit power is transmit power of the network device, and the terminal device may perform channel estimation based on the transmit power of the network device, to determine the CSI.

Optionally, the fourth indication information may be RRC signaling, a MAC CE, or DCI.

S630: The terminal device determines the CSI based on the reference signal resource associated with the first energy saving mode.

The terminal device may determine, based on the association relationship that is between the plurality of energy saving modes and the reference signal resources and that is configured in S610, the reference signal resource associated with the first energy saving mode, to measure the reference signal based on the reference signal resource associated with the first energy saving mode, to determine the CSI.

For how the terminal device determines the CSI based on measurement of the reference signal, refer to the current technology.

Optionally, the method may further include the following step:

S640: The terminal device reports the CSI to the network device. Correspondingly, the network device receives the CSI.

In conclusion, according to the communication method provided in this application, the network device may indicate, to the terminal device, an energy saving mode matching the currently used transmit antenna port, and the terminal device may determine, based on an association relationship that is between an energy saving mode and a reference signal resource and that is preconfigured by the network device, a reference signal resource used to determine CSI. In this way, an antenna port that is understood by the terminal device and that is used by the network device to send a reference signal is consistent with an antenna port that is actually used by the network device to send a reference signal. Therefore, the terminal device may determine more accurate CSI based on measurement of the reference signal sent by the antenna port through which the reference signal is actually sent.

Figure 13:
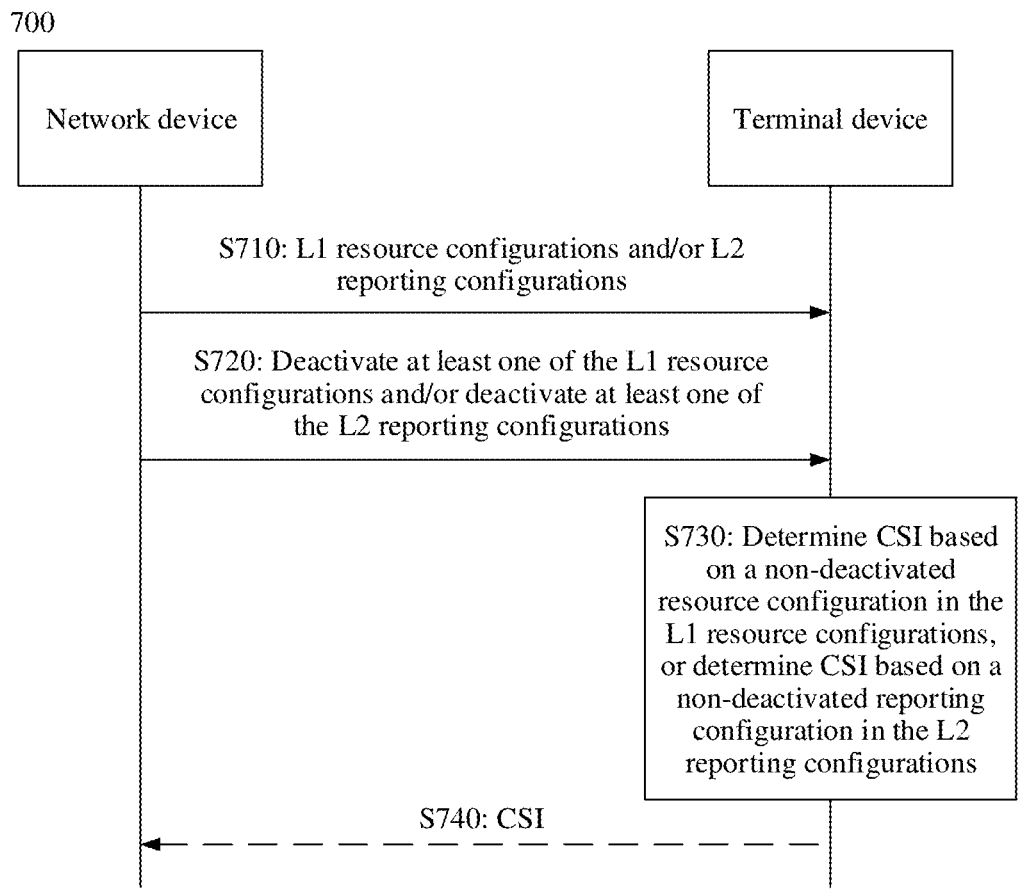

FIG. 13 is a schematic flowchart of another communication method according to this application. The following describes steps shown in FIG. 13.

S710: A network device sends third signaling to a terminal device. Correspondingly, the terminal device receives the third signaling.

The third signaling indicates L1 resource configurations and/or L2 reporting configurations, L1 and L2 are integers greater than or equal to 1, and both the resource configuration and the reporting configuration are associated with a reference signal resource.

For a meaning of the association between the resource configuration and the reference signal resource and the association between the reporting configuration and the reference signal resource, refer to the descriptions in the method 600 or a current technology. Details are not described herein again.

For example, reference signal resources associated with one resource configuration or reporting configuration correspond to a same antenna port.

Optionally, the resource configuration may be a periodic configuration, an aperiodic configuration, or a semi-persistent configuration. In other words, the reference signal resource associated with the resource configuration may be a periodic reference signal resource, an aperiodic reference signal resource, or a semi-persistent reference signal resource.

For example, when the L1 resource configurations are periodic configurations, the third signaling may be RRC signaling. When the L1 resource configurations are aperiodic configurations, the third signaling may be DCI. When the L1 resource configurations are semi-persistent configurations, the third signaling may be a MAC CE.

Optionally, the reporting configuration may be a periodic reporting configuration, an aperiodic reporting configuration, or a semi-persistent reporting configuration.

For example, when the L2 reporting configurations are periodic reporting configurations, the third signaling may be RRC signaling. When the L2 reporting configurations are aperiodic reporting configurations, the third signaling may be DCI. When the L2 reporting configurations are semi-persistent reporting configurations, the third signaling may be a MAC CE.

S720: The network device sends fifth indication information to the terminal device. Correspondingly, the terminal device receives the fifth indication information.

When the third signaling indicates the L1 resource configurations, the fifth indication information is used to deactivate at least one of the L1 resource configurations. For example, the fifth indication information may include an index of a resource configuration that needs to be deactivated.

When the third signaling indicates the L2 reporting configurations, the fifth indication information is used to deactivate at least one of the L2 reporting configurations. For example, the fifth indication information may include an index of a reporting configuration that needs to be deactivated.

For example, deactivating a resource configuration means deactivating all reference signal resources associated with the resource configuration.

For example, deactivating a reporting configuration means deactivating all reference signal resources associated with the reporting configuration, or deactivating an uplink resource associated with the reporting configuration. The uplink resource may be, for example, a PUCCH or a PUSCH.

It should be understood that an uplink resource associated with one reporting configuration is used to send CSI determined based on a reference signal resource associated with the reporting configuration.

For example, an antenna port corresponding to a reference signal resource associated with a non-deactivated resource configuration or reporting configuration belongs to a quantity of transmit antenna ports currently used by the network device.

Optionally, the network device may deactivate, by using the fifth indication information, resource configurations with a same identifier on a plurality of carriers or BWPs. This is similar for a corresponding reporting configuration, and details are not described again.

Optionally, fifth indication information may be RRC signaling, a MAC CE, or DCI.

For example, when the L1 resource configurations are periodic configurations, the fifth indication information may be carried by using RRC signaling. When the L1 resource configurations are aperiodic configurations, the fifth indication information may be carried by using DCI. When the L1 resource configurations are semi-persistent configurations, the fifth indication information may be carried by using a MAC CE or DCI.

For another example, when the L2 reporting configurations are periodic reporting configurations, the fifth indication information may be carried by using RRC signaling. When the L2 reporting configurations are aperiodic reporting configurations, the fifth indication information may be carried by using DCI. When the L2 reporting configurations are semi-persistent reporting configurations, the fifth indication information may be carried by using a MAC CE or DCI.

S730: The terminal device determines CSI based on a non-deactivated resource configuration in the L1 resource configurations, or determines CSI based on a non-deactivated reporting configuration in the L2 reporting configurations.

In one case, the third signaling indicates the L1 resource configurations. In this case, the terminal device determines the non-deactivated resource configuration based on the fifth indication information, receives a reference signal based on a reference signal resource associated with the non-deactivated resource configuration, and determines CSI by measuring the reference signal.

In another case, the third signaling indicates the L2 reporting configurations. In this case, the terminal device determines the non-deactivated reporting configuration based on the fifth indication information, and determines CSI by measuring a reference signal received based on a reference signal resource associated with the non-deactivated reporting configuration. Alternatively, the terminal device determines the non-deactivated reporting configuration based on the fifth indication information, and determines CSI by measuring a reference signal resource associated with a non-deactivated uplink resource.

Optionally, the method may further include the following step:

S740: The terminal device reports the CSI to the network device. Correspondingly, the network device receives the CSI.

According to the method provided in this application, the network device may deactivate some inappropriate resource configurations or reporting configurations based on the currently used transmit antenna port, so that the terminal device may determine CSI based on a resource configuration or a reporting configuration associated with a reference signal resource whose corresponding antenna port belongs to the transmit antenna port used by the network device. This helps improve accuracy of CSI measurement, so that scheduling performed by the network device on the terminal device can be optimized.

Optionally, the method may further include: The network device activates the deactivated resource configuration or reporting configuration.

For example, when the transmit antenna port used by the network device is the same as an antenna port associated with the deactivated resource configuration or reporting configuration, the network device may activate the deactivated resource configuration or reporting configuration. Therefore, the terminal device may continue to use these resource configurations or reporting configurations to determine the CSI.

It should be understood that the solutions in embodiments of this application may be appropriately combined for use, and explanations or descriptions of terms in the embodiments may be cross-referenced or explained in the embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

The methods according to embodiments of this application are described above in detail with reference to FIG. 2 to FIG. 13. Apparatuses according to embodiments of this application are described below in detail with reference to FIG. 14 and FIG. 16.

Figure 14:
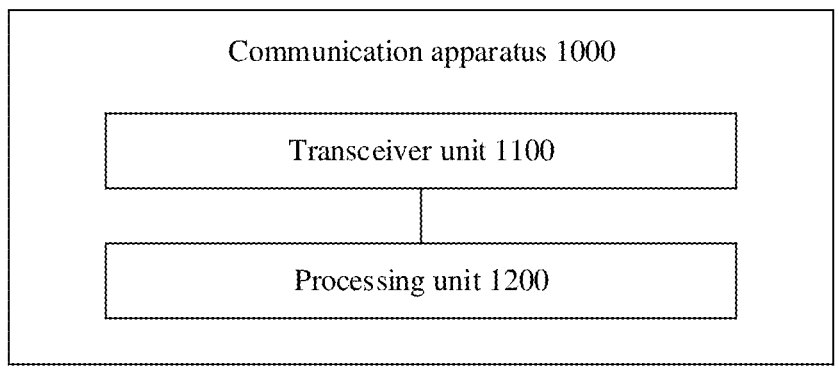
FIG. 14 is a schematic diagram of a structure of a communication apparatus according to this application.

FIG. 14 is a schematic block diagram of a communication apparatus according to an embodiment of this application. As shown in FIG. 14, a communication apparatus 1000 may include a transceiver unit 1100 and a processing unit 1200.

The transceiver unit 1100 may be configured to send information to another apparatus or receive information from another apparatus, for example, configured to send or receive first signaling. The processing unit 1200 may be configured to perform internal processing of the apparatus to determine CSI.

In an implementation, the communication apparatus 1000 may correspond to the terminal device in any one of the method 200 to the method 700. The communication apparatus 1000 may be a terminal device or a chip disposed in the terminal device, and may include units configured to perform operations performed by the terminal device. In addition, the units in the communication apparatus 1000 are separately configured to implement operations performed by the terminal device in a corresponding method.

In an embodiment, the transceiver unit 1100 is configured to receive the first signaling and first indication information. The first signaling indicates a first reference signal resource, and the first reference signal resource corresponds to P antenna ports. The processing unit 1200 is configured to determine, based on the first indication information, Q antenna ports that are in the P antenna ports and that are used to determine CSI. Both P and Q are positive integers, and P>Q.

Optionally, the first indication information indicates the Q antenna ports, or the first indication information indicates an antenna port other than the Q antenna ports in the P antenna ports.

Optionally, the first indication information indicates a first energy saving mode. The processing unit 1200 is specifically configured to determine, based on the first energy saving mode, the Q antenna ports associated with the first energy saving mode.

Optionally, $P=2*P1*P2$, P1 is a quantity of first-dimension antenna ports, and P2 is a quantity of second-dimension antenna ports. $Q=2*Q1*Q2$, Q1 is a quantity of first-dimension antenna ports, and Q2 is a quantity of second-dimension antenna ports. P1, P2, Q1, and Q2 are all positive integers. $Q1=P1$, and $Q2<P2$; or $Q1<P1$, and $Q2<P2$.

Optionally, the P antenna ports are grouped into $2*A1$ groups in ascending order of antenna port indexes, and each group includes A2 antenna ports. A1 is a positive integer, and A2 is an integer greater than or equal to 2. $Q/(2*A1)$ antenna ports in each group of A2 antenna ports belong to the Q antenna ports.

Optionally, that $Q/(2*A1)$ antenna ports in each group of A2 antenna ports belong to the Q antenna ports includes one of the following: $Q/(2*A1)$ antenna ports with larger indexes in each group of A2 antenna ports belong to the Q antenna ports; $Q/(2*A1)$ antenna ports with smaller indexes in each group of A2 antenna ports belong to the Q antenna ports; $Q/(2*A1)$ antenna ports with larger indexes in each group of A2 antenna ports in the first A1 groups of the $2*A1$ groups belong to the Q antenna ports, and $Q/(2*A1)$ antenna ports with smaller indexes in each group of A2 antenna ports in the last A1 groups of the $2*A1$ groups belong to the Q antenna ports; and $Q/(2*A1)$ antenna ports with smaller indexes in each group of A2 antenna ports in the first A1 groups of the $2*A1$ groups belong to the Q antenna ports, and $Q/(2*A1)$ antenna ports with larger indexes in each group of A2 antenna ports in the last A1 groups of the $2*A1$ groups belong to the Q antenna ports.

Optionally, the processing unit 1200 is further configured to determine the CSI based on the Q antenna ports and first information. The first information indicates that a quantity of first-dimension antenna ports is B1 and a quantity of second-dimension antenna ports is B2, and both B1 and B2 are positive integers. C1 is a quantity of first-dimension antenna ports indicated by first codebook configuration information associated with the first reference signal resource, and C2 is a quantity of second-dimension antenna ports indicated by the first codebook configuration information. B1=C1, and B2<C2; or B1<C1, and B2=C2; or B1<C1, and B2<C2.

In another embodiment, the transceiver unit 1100 is configured to receive second signaling and second indication information, where the second signaling indicates a second reference signal resource, and the second indication information indicates to deactivate the second reference signal resource and activates a third reference signal resource. The processing unit 1200 is configured to determine CSI based on the second indication information.

The second indication information is used to deactivate the second reference signal resource and activate the third reference signal resource. Alternatively, the second indication information is used to deactivate a part of the second reference signal resource, and the second reference signal resource is a periodic reference signal resource. Alternatively, the second indication information indicates that a reference signal resource with a quantity of corresponding antenna ports being greater than U in the second reference signal resource is not used to determine CSI, or the second indication information indicates that a reference signal resource with a quantity of corresponding antenna ports being less than or equal to U in the second reference signal resource is used to determine CSI, where U is a positive integer.

In another embodiment, the transceiver unit 1100 is configured to receive third indication information and fourth indication information, where the third indication information indicates an association relationship between a plurality of energy saving modes and reference signal resources, and the fourth indication information indicates a first energy saving mode in the plurality of energy saving modes. The processing unit 1200 is configured to determine CSI based on a reference signal resource associated with the first energy saving mode.

In still another embodiment, the transceiver unit 1100 is configured to receive third signaling, where the third signaling indicates L1 resource configurations and/or L2 reporting configurations, L1 and L2 are integers greater than or equal to 1, and both the resource configuration and the reporting configuration are associated with a reference signal resource. The transceiver unit 1100 is further configured to receive fifth indication information, where the fifth indication information is used to deactivate at least one of the L1 resource configurations and/or deactivate at least one of the L2 reporting configurations. The processing unit 1200 is configured to determine CSI based on a non-deactivated resource configuration in the L1 resource configurations, or determine CSI based on a non-deactivated reporting configuration in the L2 reporting configurations.

In an implementation, the communication apparatus 1000 may correspond to the network device in any one of the method 200 to the method 700. The communication apparatus 1000 may be a network device or a chip disposed in the network device, and may include units configured to perform operations performed by the network device. In addition, the units in the communication apparatus 1000 are separately configured to implement operations performed by the network device in a corresponding method.

In an embodiment, the transceiver unit 1100 is configured to send first signaling, where the first signaling indicates a first reference signal resource, and the first reference signal resource corresponds to P antenna ports. The processing unit 1200 is configured to determine Q antenna ports in the P antenna ports. The transceiver unit 1100 is further configured to send first indication information, where the first indication information indicates one of the following: the Q antenna ports, an antenna port other than the Q antenna ports in the P antenna ports, and a first energy saving mode. The first energy saving mode is associated with the Q antenna ports.

Optionally, P=2*P1*P2, P1 is a quantity of first-dimension antenna ports, and P2 is a quantity of second-dimension antenna ports. Q=2*Q1*Q2, Q1 is a quantity of first-dimension antenna ports, and Q2 is a quantity of second-dimension antenna ports. P1, P2, Q1, and Q2 are all positive integers. Q1=P1, and Q2<P2; or Q1<P1, and Q2<P2.

Optionally, the P antenna ports are grouped into 2*A1 groups in ascending order of antenna port indexes, and each group includes A2 antenna ports. A1 is a positive integer, and A2 is an integer greater than or equal to 2. Q/(2*A1) antenna ports in each group of A2 antenna ports belong to the Q antenna ports.

Optionally, that Q/(2*A1) antenna ports in each group of A2 antenna ports belong to the Q antenna ports includes one of the following: Q/(2*A1) antenna ports with larger indexes in each group of A2 antenna ports belong to the Q antenna ports; Q/(2*A1) antenna ports with smaller indexes in each group of A2 antenna ports belong to the Q antenna ports; Q/(2*A1) antenna ports with larger indexes in each group of A2 antenna ports in the first A1 groups of the 2*A1 groups belong to the Q antenna ports, and Q/(2*A1) antenna ports with smaller indexes in each group of A2 antenna ports in the last A1 groups of the 2*A1 groups belong to the Q antenna ports; and Q/(2*A1) antenna ports with smaller indexes in each group of A2 antenna ports in the first A1 groups of the 2*A1 groups belong to the Q antenna ports, and Q/(2*A1) antenna ports with larger indexes in each group of A2 antenna ports in the last A1 groups of the 2*A1 groups belong to the Q antenna ports.

Optionally, the transceiver unit 1100 is further configured to send first information. The first information indicates that a quantity of first-dimension antenna ports is B1 and a quantity of second-dimension antenna ports is B2, and both B1 and B2 are positive integers. C1 is a quantity of first-dimension antenna ports indicated by first codebook configuration information associated with the first reference signal resource, and C2 is a quantity of second-dimension antenna ports indicated by the first codebook configuration information. B1=C1, and B2<C2; or B1<C1, and B2=C2; or B1<C1, and B2<C2.

In another embodiment, the transceiver unit 1100 is configured to send second signaling and second indication information, where the second signaling indicates a second reference signal resource, and the second indication information indicates to deactivate the second reference signal resource and activates a third reference signal resource.

The second indication information is used to deactivate the second reference signal resource and activate the third reference signal resource. Alternatively, the second indication information is used to deactivate a part of the second reference signal resource, and the second reference signal resource is a periodic reference signal resource. Alternatively, the second indication information indicates that a reference signal resource with a quantity of corresponding antenna ports being greater than U in the second reference signal resource is not used to determine CSI, or the second indication information indicates that a reference signal resource with a quantity of corresponding antenna ports being less than or equal to U in the second reference signal resource is used to determine CSI, where U is a positive integer.

In another embodiment, the transceiver unit 1100 is configured to send third indication information and fourth indication information, where the third indication information indicates an association relationship between a plurality of energy saving modes and reference signal resources, and the fourth indication information indicates a first energy saving mode in the plurality of energy saving modes.

In still another embodiment, the transceiver unit 1100 is configured to send third signaling, where the third signaling indicates L1 resource configurations and/or L2 reporting configurations, L1 and L2 are integers greater than or equal to 1, and both the resource configuration and the reporting configuration are associated with a reference signal resource. The transceiver unit 1100 is further configured to send fifth indication information, where the fifth indication information is used to deactivate at least one of the L1 resource configurations and/or deactivate at least one of the L2 reporting configurations.

It should be understood that a specific process in which each unit performs the foregoing corresponding step of the corresponding network element is described in detail in the foregoing method embodiments. For brevity, details are not described herein again.

Figure 15:
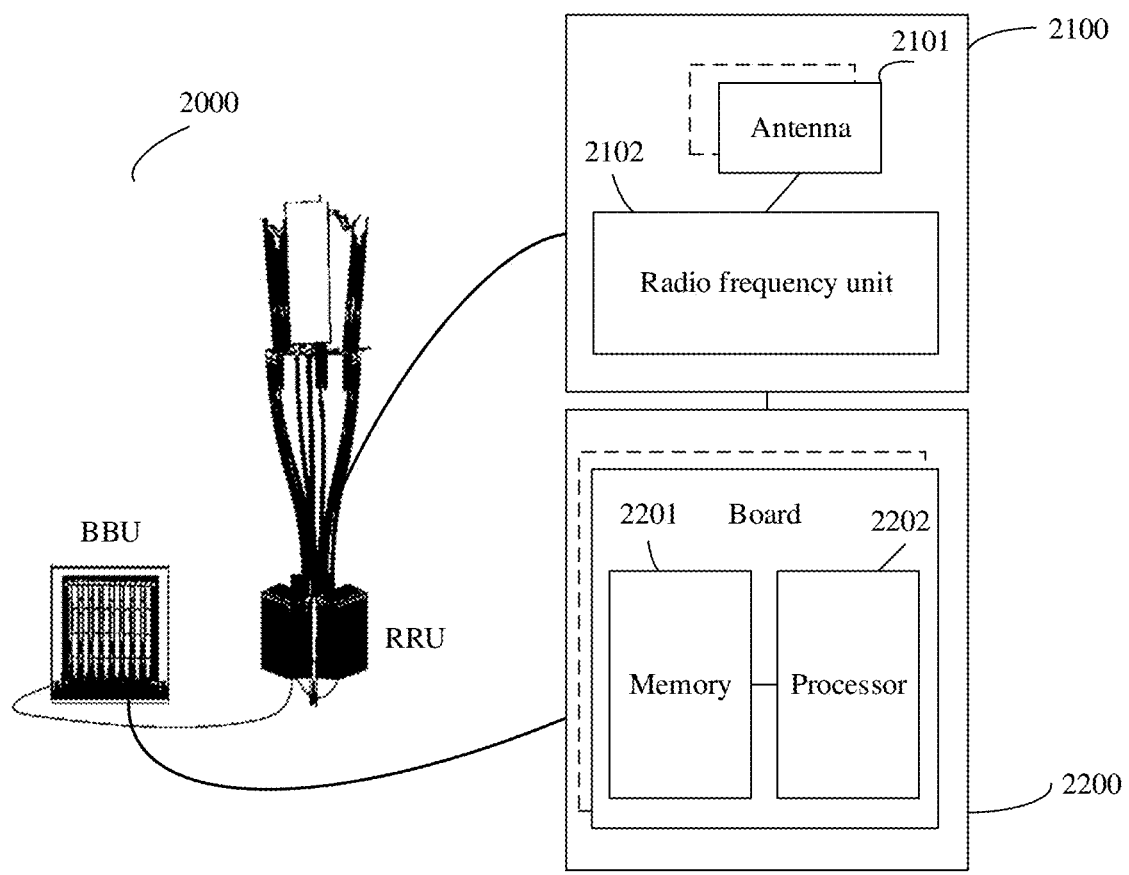
FIG. 15 is a schematic diagram of a structure of a network device according to this application.

It should be further understood that when the communication apparatus 1000 is the network device, the transceiver unit 1100 in the communication apparatus 1000 may correspond to an RRU 3100 in a network device 2000 shown in FIG. 15, and the processing unit 1200 in the communication apparatus 1000 may correspond to a BBU 3200 in the network device 2000 shown in FIG. 15. When the communication apparatus 1000 is a chip disposed in the network device, the transceiver unit 1100 in the communication apparatus 1000 may be an input/output interface.

Figure 16:
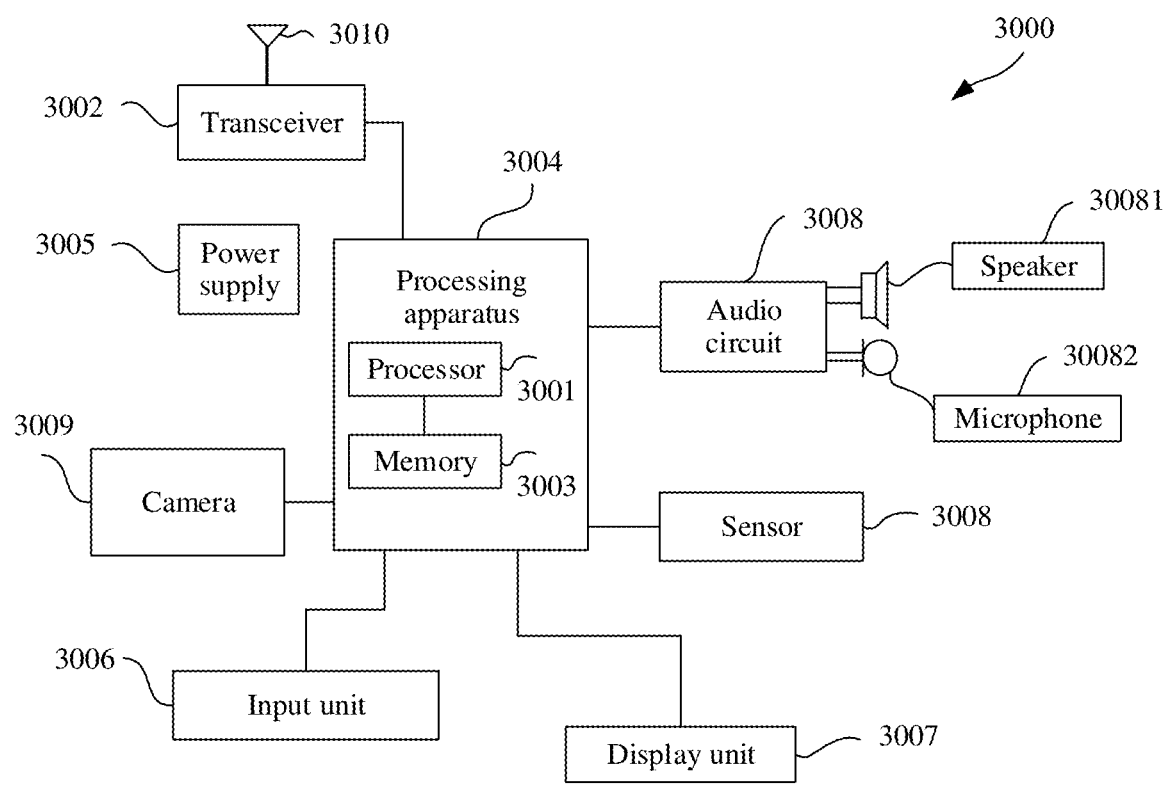
FIG. 16 is a schematic diagram of a structure of a terminal device according to this application.

It should be further understood that when the communication apparatus 1000 is the terminal device, the transceiver unit 1100 in the communication apparatus 1000 may correspond to a transceiver 3002 in a terminal device 3000 shown in FIG. 16, and the processing unit 1200 in the communication apparatus 1000 may correspond to a processor 3001 in the terminal device 3000 shown in FIG. 16.

FIG. 15 is a schematic diagram of a structure of a network device according to an embodiment of this application, for example, may be a schematic diagram of a structure of a base station. The base station 2000 may be used in the system shown in FIG. 1, to perform functions of the network device in the foregoing method embodiments. As shown in the figure, the base station 2000 may include one or more radio frequency units, for example, one or more remote radio units (RRUs) 2100, and one or more baseband units (BBUs) (which may also be referred to as distributed units (DUs)) 2200. The RRU 2100 may be referred to as a transceiver unit or a communication unit, and corresponds to the transceiver unit 1100 in FIG. 14. Optionally, the transceiver unit 2100 may also be referred to as a transceiver machine, a transceiver circuit, a transceiver, or the like, and may include at least one antenna 2101 and a radio frequency unit 2102. Optionally, the transceiver unit 2100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 2100 is partially configured to: perform radio frequency signal sending and receiving and perform conversion between a radio frequency signal and a baseband signal. The BBU 2200 is mainly configured to: perform baseband processing, control the base station, and the like. The RRU 2100 and the BBU 2200 may be physically disposed together; or may be physically separately disposed, that is, in a distributed base station.

The BBU 2200 is a control center of the base station, or may be referred to as a processing unit. The BBU 2200 may correspond to the processing unit 1200 in FIG. 14, and is mainly configured to implement a baseband processing function, for example, channel coding, multiplexing, modulation, or spreading. For example, the BBU (processing unit) may be configured to control the base station to perform an operation procedure of the network device in the foregoing method embodiment.

In an example, the BBU 2200 may include one or more boards. A plurality of boards may jointly support a radio access network (for example, an LTE network) having a single access standard, or may separately support radio access networks (for example, the LTE network, a 5G network, or another network) having different access standards. The BBU 2200 further includes a memory 2201 and a processor 2202. The memory 2201 is configured to store necessary instructions and data. The processor 2202 is configured to control the base station to perform a necessary action, for example, configured to control the base station to perform the operation procedure related to the network device in the foregoing method embodiment. The memory 2201 and the processor 2202 may serve the one or more boards. In other words, a memory and a processor may be deployed on each board. Alternatively, a plurality of boards may share a same memory and a same processor. In addition, a necessary circuit may be further disposed on each board.

It should be understood that the base station 2000 shown in FIG. 15 can implement processes related to the network device in the foregoing method embodiments. Operations or functions of modules in the base station 2000 are respectively intended to implement corresponding procedures in the foregoing method embodiments. For details, refer to the descriptions in the foregoing method embodiments. To avoid repetition, detailed descriptions are appropriately omitted herein.

The BBU 2200 may be configured to perform an action that is implemented inside the network device and that is described in the foregoing method embodiments, and the RRU 2100 may be configured to perform an action of sending or receiving that is performed by the network device to or from the terminal device and that is described in the foregoing method embodiments. For details, refer to the descriptions in the foregoing method embodiments. Details are not described herein again.

FIG. 16 is a schematic diagram of a structure of a terminal device 3000 according to an embodiment of this application. As shown in the figure, the terminal device 3000 includes a processor 3001 and a transceiver 3002. Optionally, the terminal device 3000 may further include a memory 3003. The processor 3001, the transceiver 3002, and the memory 3003 communicate with each other through an internal connection path, to transfer a control signal and/or a data signal. The memory 3003 is configured to store a computer program. The processor 3001 is configured to invoke the computer program from the memory 3003 and run the computer program, to control the transceiver 3002 to receive/send a signal.

The processor 3001 and the memory 3003 may be integrated into one processing apparatus 3004. The processor 3001 is configured to execute program code stored in the memory 3003 to implement the foregoing functions. It should be understood that the processing apparatus 3004 shown in the figure is merely an example. During specific implementation, the memory 3003 may also be integrated into the processor 3001, or may be independent of the processor 3001. This is not limited in this application.

The terminal device 3000 may further include an antenna 3010, configured to send, by using a radio signal, uplink data or uplink control signaling output by the transceiver 3002.

It should be understood that, the terminal device 3000 shown in FIG. 16 can implement processes related to the terminal device in the foregoing method embodiments. Operations or functions of modules in the terminal device 3000 are respectively intended to implement corresponding procedures in the foregoing method embodiments. For details, refer to the descriptions in the foregoing method embodiments. To avoid repetition, detailed descriptions are appropriately omitted herein.

Optionally, the terminal device 3000 may further include a power supply 3005, configured to supply power to various components or circuits in the terminal device.

In addition, to improve the functions of the terminal device, the terminal device 3000 may further include one or more of an input unit 3006, a display unit 3007, an audio circuit 3008, a camera 3009, a sensor 3008, and the like, and the audio circuit may further include a speaker 30081, a microphone 30082, and the like.

It should be understood that the processing apparatus may be a chip. For example, the processing apparatus may be a field programmable gate array (FPGA), may be a general-purpose processor, a digital signal processor (DSP), an application specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processing circuit (DSP), may be a micro controller unit (MCU), or may be a programmable controller (PLD) or another integrated chip. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

The memory 3003 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory in the system and the method described in this specification is intended to include but is not limited to these memories and any memory of another appropriate type.

This application further provides a computer program product. The computer program product includes computer program code. When the computer program code runs on a computer, the computer performs the method performed by the terminal device or the network device in any one of the foregoing method embodiments.

This application further provides a computer-readable medium. The computer-readable medium stores program code. When the program code runs on a computer, the computer is enabled to perform the method performed by the network device or the terminal device in the foregoing method embodiments.

This application further provides a system, including a terminal device and a network device.

An embodiment of this application further provides a processing apparatus, including a processor and an interface. The processor is configured to perform the method performed by the terminal device or the network device in any one of the foregoing method embodiments.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

Terms such as "component", "module", and "system" used in this specification are used to indicate a computer-related entity, hardware, firmware, a combination of hardware and software, software, or software being executed. For example, a component may be but is not limited to a process that runs on a processor, a processor, an object, an executable file, a thread of execution, a program, or a computer. As illustrated by using figures, both a computing device and an application that is run on the computing device may be components. One or more components may reside within a process or a thread of execution, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, a distributed system, or across a network such as the internet interacting with another system by using the signal).

It should be understood that, an "embodiment" mentioned throughout this specification means that particular features, structures, or characteristics related to the embodiment are included in at least one embodiment of this application. Therefore, embodiments in the entire specification do not necessarily refer to a same embodiment. Moreover, the particular features, structures, or characteristics may be combined in one or more embodiments in any proper manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that, in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based only on A. That is, B may also be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "I" in this specification indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiment. Details are not described herein again.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in the computer-readable storage medium. Based on this understanding, the technical solutions of this application essentially, or the part contributing to the current technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving first signaling, wherein the first signaling indicates a first reference signal resource, and the first reference signal resource corresponds to P antenna ports;
receiving first indication information, wherein the first indication information indicates a first energy saving mode of a plurality of energy saving modes; and
in response to receiving the first indication information indicating the first energy saving mode, determining, by a processor, based on the first energy saving mode, Q antenna ports associated with the first energy saving mode, wherein the Q antenna ports are in the P antenna ports, and the Q antenna ports are used to determine channel state information (CSI),
wherein both P and Q are positive integers and P>Q.

2. The communication method according to claim 1, wherein the first indication information indicates the Q antenna ports.

3. The communication method according to claim 1, wherein the communication method further comprises:
determining the CSI based on the Q antenna ports and first dimension information, wherein
the first dimension information indicates that a first quantity of first-dimension antenna ports is B1 and a second quantity of second-dimension antenna ports is B2, and both B1 and B2 are positive integers,
C1 is a third quantity of first-dimension antenna ports indicated by first codebook configuration information associated with the first reference signal resource,
C2 is a fourth quantity of second-dimension antenna ports indicated by the first codebook configuration information, and
B1=C1, and B2<C2; or
B1<C1, and B2=C2; or
B1<C1, and B2<C2.

4. The communication method according to claim 1, wherein
P=2*P1*P2, where P1 is a first quantity of first-dimension antenna ports and P2 is a second quantity of second-dimension antenna ports,
Q=2*Q1*Q2, where Q1 is a third quantity of first-dimension antenna ports and Q2 is a fourth quantity of second-dimension antenna ports,
P1, P2, Q1, and Q2 are all positive integers, and
Q1=P1, and Q2<P2; or
Q1<P1, and Q2<P2.

5. The communication method according to claim 1, wherein
the P antenna ports are grouped into 2*A1 groups in ascending order of antenna port indexes, and each group comprises A2 antenna ports, where A1 is a positive integer, and A2 is an integer greater than or equal to 2, and
Q/(2*A1) antenna ports in each group of A2 antenna ports belong to the Q antenna ports.

6. A communication method, comprising:
sending first signaling, wherein the first signaling indicates a first reference signal resource, and the first reference signal resource corresponds to P antenna ports; and
sending first indication information, wherein the first indication information indicates a first energy saving mode of a plurality of energy saving modes to cause a terminal device to determine, based on the first energy saving mode, Q antenna ports associated with the first energy saving mode, wherein the Q antenna ports are in the P antenna ports, and the Q antenna ports are used to determine channel state information (CSI),
wherein both P and Q are positive integers and P>Q.

7. The communication method according to claim 6, wherein the communication method further comprises:
sending first dimension information,
wherein
the first dimension information indicates that a first quantity of first-dimension antenna ports is B1 and a second quantity of second-dimension antenna ports is B2, and both B1 and B2 are positive integers,
C1 is a third quantity of first-dimension antenna ports indicated by first codebook configuration information associated with the first reference signal resource,
C2 is a fourth quantity of second-dimension antenna ports indicated by the first codebook configuration information, and
B1=C1, and B2<C2; or
B1<C1, and B2=C2; or
B1<C1, and B2<C2.

8. The communication method according to claim 6, wherein
P=2*P1*P2, where P1 is a first quantity of first-dimension antenna ports and P2 is a second quantity of second-dimension antenna ports,
Q=2*Q1*Q2, where Q1 is a third quantity of first-dimension antenna ports and Q2 is a fourth quantity of second-dimension antenna ports,
P1, P2, Q1, and Q2 are all positive integers, and
Q1=P1, and Q2<P2; or
Q1<P1, and Q2<P2.

9. The communication method according to claim 6, wherein
the P antenna ports are grouped into 2*A1 groups in ascending order of antenna port indexes, and each group comprises A2 antenna ports, where A1 is a positive integer, and A2 is an integer greater than or equal to 2, and
Q/(2*A1) antenna ports in each group of A2 antenna ports belong to the Q antenna ports.

10. A communication apparatus, comprising:
a non-transitory memory storage comprising instructions; and
one or more processors in communication with the memory storage, wherein the instructions, when executed by the one or more processors, cause the communication apparatus to:
receive first signaling, wherein the first signaling indicates a first reference signal resource, and the first reference signal resource corresponds to P antenna ports;
receive first indication information, wherein the first indication information indicates a first energy saving mode of a plurality of energy saving modes; and
in response to receiving the first indication information indicating the first energy saving mode, determine, based on the first energy saving mode, Q antenna ports associated with the first energy saving mode, wherein the Q antenna ports are in the P antenna ports, and the Q antenna ports are used to determine channel state information (CSI), wherein both P and Q are positive integers and P>Q.

11. The communication apparatus according to claim 10, wherein the first indication information indicates the Q antenna ports.

12. The communication apparatus according to claim 10, wherein the instructions, when executed by the one or more processors, further cause the communication apparatus to:
determine the CSI based on the Q antenna ports and first dimension information, wherein
the first dimension information indicates that a first quantity of first-dimension antenna ports is B1 and a second quantity of second-dimension antenna ports is B2, and both B1 and B2 are positive integers,
C1 is a third quantity of first-dimension antenna ports indicated by first codebook configuration information associated with the first reference signal resource,
C2 is a fourth quantity of second-dimension antenna ports indicated by the first codebook configuration information, and
B1=C1, and B2<C2; or
B1<C1, and B2=C2; or
B1<C1, and B2<C2.

13. The communication apparatus according to claim 10, wherein
P=2*P1*P2, P1 is a first quantity of first-dimension antenna ports and P2 is a second quantity of second-dimension antenna ports,
Q=2*Q1*Q2, where Q1 is a third quantity of first-dimension antenna ports and Q2 is a fourth quantity of second-dimension antenna ports,
P1, P2, Q1, and Q2 are all positive integers, and
Q1=P1, and Q2<P2; or
Q1<P1, and Q2<P2.

14. The communication apparatus according to claim 10, wherein the P antenna ports are grouped into 2*A1 groups in ascending order of antenna port indexes, and each group comprises A2 antenna ports, where A1 is a positive integer, and A2 is an integer greater than or equal to 2, and
Q/(2*A1) antenna ports in each group of A2 antenna ports belong to the Q antenna ports.

15. The communication apparatus according to claim 14, wherein that Q/(2*A1) antenna ports in each group of A2 antenna ports belong to the Q antenna ports comprises one of the following:
Q/(2*A1) antenna ports with larger indexes in each group of A2 antenna ports belong to the Q antenna ports;
Q/(2*A1) antenna ports with smaller indexes in each group of A2 antenna ports belong to the Q antenna ports;
Q/(2*A1) antenna ports with larger indexes in each group of A2 antenna ports in the first A1 groups of the 2*A1 groups belong to the Q antenna ports, and Q/(2*A1) antenna ports with smaller indexes in each group of A2 antenna ports in the last A1 groups of the 2*A1 groups belong to the Q antenna ports; or
Q/(2*A1) antenna ports with smaller indexes in each group of A2 antenna ports in the first A1 groups of the 2*A1 groups belong to the Q antenna ports, and Q/(2*A1) antenna ports with larger indexes in each group of A2 antenna ports in the last A1 groups of the 2*A1 groups belong to the Q antenna ports.

16. A communication apparatus, comprising:
a non-transitory memory storage comprising instructions; and
one or more processors in communication with the memory storage, wherein the instructions, when executed by the one or more processors, cause the communication apparatus to:
send first signaling, wherein the first signaling indicates a first reference signal resource, and the first reference signal resource corresponds to P antenna ports; and
send first indication information, wherein the first indication information indicates a first energy saving mode of a plurality of energy saving modes to cause a terminal device to determine, based on the first energy saving mode, Q antenna ports associated with the first energy saving mode, wherein the Q antenna ports are in the P antenna ports, and the Q antenna ports are used to determine channel state information (CSI),
wherein both P and Q are positive integers and P>Q.

17. The communication apparatus according to claim 16, wherein the instructions, when executed by the one or more processors, further cause the communication apparatus to:
send first dimension information,
wherein
the first dimension information indicates that a first quantity of first-dimension antenna ports is B1 and a second quantity of second-dimension antenna ports is B2, and both B1 and B2 are positive integers,
C1 is a third quantity of first-dimension antenna ports indicated by first codebook configuration information associated with the first reference signal resource,
C2 is a fourth quantity of second-dimension antenna ports indicated by the first codebook configuration information, and
B1=C1, and B2<C2; or
B1<C1, and B2=C2; or
B1<C1, and B2<C2.

18. The communication apparatus according to claim 16, wherein
P=2*P1*P2, where P1 is a first quantity of first-dimension antenna ports and P2 is a second quantity of second-dimension antenna ports,
Q=2*Q1*Q2, where Q1 is a third quantity of first-dimension antenna ports and Q2 is a fourth quantity of second-dimension antenna ports,
P1, P2, Q1, and Q2 are all positive integers, and
Q1=P1, and Q2<P2; or
Q1<P1, and Q2<P2.

19. The communication apparatus according to claim 16, wherein
the P antenna ports are grouped into 2*A1 groups in ascending order of antenna port indexes, and each group comprises A2 antenna ports, where A1 is a positive integer, and A2 is an integer greater than or equal to 2, and
Q/(2*A1) antenna ports in each group of A2 antenna ports belong to the Q antenna ports.

20. The communication apparatus according to claim 19, wherein that Q/(2*A1) antenna ports in each group of A2 antenna ports belong to the Q antenna ports comprises one of the following:
Q/(2*A1) antenna ports with larger indexes in each group of A2 antenna ports belong to the Q antenna ports;
Q/(2*A1) antenna ports with smaller indexes in each group of A2 antenna ports belong to the Q antenna ports;
Q/(2*A1) antenna ports with larger indexes in each group of A2 antenna ports in the first A1 groups of the 2*A1 groups belong to the Q antenna ports, and Q/(2*A1) antenna ports with smaller indexes in each group of A2 antenna ports in the last A1 groups of the 2*A1 groups belong to the Q antenna ports; or Q/(2*A1) antenna ports with smaller indexes in each group of A2 antenna ports in the first A1 groups of the 2*A1 groups belong to the Q antenna ports, and Q/(2*A1) antenna ports with larger indexes in each group of A2 antenna ports in the last A1 groups of the 2*A1 groups belong to the Q antenna ports.

* * * * *